(12) United States Patent
Liu et al.

(10) Patent No.: US 10,699,429 B2
(45) Date of Patent: Jun. 30, 2020

(54) CODING DISTANCE TOPOLOGIES FOR STRUCTURED LIGHT PATTERNS FOR 3D RECONSTRUCTION

(71) Applicant: Cognex Corporation, Natick, MA (US)

(72) Inventors: Zihan Hans Liu, Cambridge, MA (US); Nathaniel Bogan, Natick, MA (US); Andrew Hoelscher, Cambridge, MA (US); Eric Moore, Longmont, CO (US); Benjamin Braker, Louisville, CO (US)

(73) Assignee: Cognex Corporation, Natick, MA (US)

( * ) Notice: Subject to any disclaimer, the term of this patent is extended or adjusted under 35 U.S.C. 154(b) by 0 days.

(21) Appl. No.: 16/104,106

(22) Filed: Aug. 16, 2018

(65) Prior Publication Data

US 2019/0139242 A1 May 9, 2019

Related U.S. Application Data

(60) Provisional application No. 62/547,777, filed on Aug. 19, 2017.

(51) Int. Cl.
| | | |
|---|---|---|
| *G06T 7/521* | (2017.01) | |
| *G06T 7/73* | (2017.01) | |
| *H04N 5/225* | (2006.01) | |

(52) U.S. Cl.
CPC .............. *G06T 7/521* (2017.01); *G06T 7/73* (2017.01); *H04N 5/2256* (2013.01); *G06T 2207/10028* (2013.01); *G06T 2207/10152* (2013.01)

(58) Field of Classification Search
USPC .......................................................... 348/57
See application file for complete search history.

(56) References Cited

U.S. PATENT DOCUMENTS

| 4,687,326 A | 8/1987 | Corby |
|---|---|---|
| 4,705,401 A | 11/1987 | Addleman |
| (Continued) | | |

FOREIGN PATENT DOCUMENTS

| DE | 4206836 | 9/1999 |
|---|---|---|
| EP | 1247070 | 10/2007 |
| (Continued) | | |

OTHER PUBLICATIONS

Examination Report, European Appl. No. 18 189 419.7, dated Feb. 12, 2020, EPO.

(Continued)

*Primary Examiner* — Behrooz M Senfi

(57) ABSTRACT

Methods, systems, and devices for 3D measurement and/or pattern generation are provided in accordance with various embodiments. Some embodiments include a method of pattern projection that may include projecting one or more patterns. Each pattern from the one or more patterns may include an arrangement of three or more symbols that are arranged such that for each symbol in the arrangement, a degree of similarity between said symbol and a most proximal of the remaining symbols in the arrangement is less than a degree of similarity between said symbol and a most distal of the remaining symbols in the arrangement. Some embodiments further include: illuminating an object using the one or more projected patterns; collecting one or more images of the illuminated object; and/or computing one or more 3D locations of the illuminated object based on the one or more projected patterns and the one or more collected images.

34 Claims, 12 Drawing Sheets

(56) References Cited

U.S. PATENT DOCUMENTS

| | | |
|---|---|---|
| 5,825,933 A | 10/1998 | Hecht |
| 6,057,892 A | 5/2000 | Borer |
| 6,076,738 A | 6/2000 | Bloomberg |
| 6,341,016 B1 | 1/2002 | Malione |
| 6,441,888 B1 | 8/2002 | Azuma |
| 6,621,578 B1 | 9/2003 | Mizoguchi |
| 6,751,344 B1 | 6/2004 | Grumbine |
| 6,754,370 B1 | 6/2004 | Hall-Holt |
| 7,002,699 B2 | 2/2006 | Kong |
| 7,013,040 B2 | 3/2006 | Shiratani |
| 7,103,212 B2 | 9/2006 | Hager |
| 7,164,789 B2 | 1/2007 | Chen |
| 7,433,024 B2 | 10/2008 | Garcia |
| 7,768,656 B2 | 8/2010 | Lapa |
| 7,804,997 B2 | 9/2010 | Geng |
| 8,050,461 B2 | 11/2011 | Shpunt |
| 8,090,194 B2 | 1/2012 | Golrdon |
| 8,150,142 B2 | 4/2012 | Freedman |
| 8,208,719 B2 | 6/2012 | Gordon |
| 8,350,847 B2 | 1/2013 | Shpunt |
| 8,384,997 B2 | 2/2013 | Shpunt |
| 8,531,650 B2 * | 9/2013 | Feldkhun ........... G01B 11/2518 356/4.01 |
| 8,538,166 B2 | 9/2013 | Gordon |
| 8,717,417 B2 | 5/2014 | Sali |
| 8,749,796 B2 | 6/2014 | Pesach |
| 8,786,682 B2 | 7/2014 | Shpunt |
| 8,836,921 B2 | 9/2014 | Feldkhun |
| 8,908,277 B2 | 12/2014 | Pesach |
| 8,982,182 B2 | 3/2015 | Shpunt |
| 9,066,087 B2 | 6/2015 | Shpunt |
| 9,562,760 B2 * | 2/2017 | Braker ................. G01B 11/002 |
| 9,696,137 B2 | 7/2017 | Braker |
| 10,088,556 B2 | 10/2018 | Braker |
| 10,295,655 B2 | 5/2019 | Braker |
| 10,317,193 B2 | 6/2019 | Braker |
| 2003/0127593 A1 | 7/2003 | Shinada |
| 2004/0233437 A1 | 11/2004 | Horie |
| 2004/0246473 A1 | 12/2004 | Hermany |
| 2005/0073323 A1 | 4/2005 | Kohno |
| 2006/0192925 A1 | 8/2006 | Chang |
| 2007/0046924 A1 | 3/2007 | Chang |
| 2007/0109527 A1 | 5/2007 | Wenstrand |
| 2007/0115484 A1 | 5/2007 | Huang |
| 2007/0177160 A1 | 8/2007 | Sasaki |
| 2007/0268398 A1 | 11/2007 | Raskar |
| 2008/0049222 A1 | 2/2008 | Yamaguchi |
| 2008/0118143 A1 | 5/2008 | Gordon |
| 2009/0009741 A1 | 1/2009 | Okita |
| 2009/0059236 A1 | 3/2009 | Meeks |
| 2009/0246655 A1 | 10/2009 | Touya |
| 2010/0008588 A1 | 1/2010 | Feldkhun |
| 2010/0020078 A1 | 1/2010 | Shpunt |
| 2010/0201811 A1 | 8/2010 | Garcia |
| 2010/0225746 A1 | 9/2010 | Shpunt |
| 2011/0134220 A1 | 6/2011 | Barbour |
| 2012/0032077 A1 | 2/2012 | Matsumoto |
| 2012/0063672 A1 | 3/2012 | Gordon |
| 2013/0048494 A1 | 2/2013 | Kikuchi |
| 2013/0108104 A1 | 5/2013 | Sonoda |
| 2013/0250066 A1 | 9/2013 | Abraham |
| 2014/0022348 A1 | 1/2014 | Shpunt |
| 2014/0076500 A1 | 3/2014 | Honda |
| 2014/0150981 A1 | 6/2014 | Itou |
| 2015/0077764 A1 | 3/2015 | Braker |
| 2015/0116687 A1 | 4/2015 | Yoneda |
| 2015/0253123 A1* | 9/2015 | Braker ................. G01B 11/002 356/610 |
| 2015/0292866 A1 | 10/2015 | Sasaki |
| 2017/0048507 A1* | 2/2017 | Campbell ............... G06T 5/005 |
| 2017/0205495 A1 | 7/2017 | Braker |
| 2018/0045503 A1 | 2/2018 | Braker |
| 2018/0335506 A1 | 11/2018 | Braker |
| 2019/0302234 A1 | 10/2019 | Braker |
| 2019/0353472 A1 | 11/2019 | Braker |

FOREIGN PATENT DOCUMENTS

| | | | |
|---|---|---|---|
| WO | WO2007043036 | 4/2007 | |
| WO | WO2010006081 | 1/2010 | |
| WO | WO-2013076583 A2 * | 5/2013 | ......... G01B 11/2513 |
| WO | WO-2016153680 A1 * | 9/2016 | ............ G06T 11/60 |

OTHER PUBLICATIONS

Agarwal, A., N. Agarwal, C. Rajasekhar, and R. Patel, Performance Analysis of 2-D Optical Codes with Cross Correlation Value of One and Two in Optical CDMA System, International Journal of Electrical Engineering & Communication Engineering for Applied Research, vol. 52, No. 1, Jan.-Jun. 2012, pp. 21-29.

Anna, Tulsi, et al., "Sinusoidal Fringe Projection System Based on Compact and Non-Mechanical Scanning Low-Coherence Michelson Interferometer for Three-Dimensional Shape Measurement," Optics Communications 282; 1237-1242, 2008.11.080.

Chang, Ming, et al., "High Speed Three-Dimensional Profilometry Utilizing Laser Diode Arrays," Optical Engineering, vol. 42 No. 12, pp. 3595-3599 (Dec. 2003).

Chen, Frank, et al., "Overview of Three-Dimensional Shape Measurement Using Optical Methods," Optical Engineering, vol. 39, No. 1, pp. 10-22 (Jan. 2000).

Coggrave, C. R., "High-speed Surface Profilometer Based on a Spatial Light Modulator and Pipeline Image Processor," Optical Engineering, vol. 38, No. 9, pp. 1573-1581 (Sep. 1999).

Geng, Jason, "Structured-light 3D surface Imaging: a Tutorial," Advances in Optics and Photonics vol. 3, 128-160 (2011).

Gorthi, Sai Siva, et al., "Fringe Projection Techniques: Whither we are?" Optics and Lasers in Engineering vol. 48, No. 2:133-140, 2010.

Guan, Chun, Laurence G. Hassebrook, Daniel L. Lau, Veeraganesh Yalla, "Near-infrared composite pattern projection for continuous motion hand-computer interaction," Journal of Visual Communication and Image Representation, vol. 18, Issue 2, Apr. 2007, pp. 141-150, ISSN 1047-3203, http://dx.doi.org/10.1016/j.jvcir.2006.11.006.

Guo, Hongwei, Mingyi Chen, and Peng Zheng, "Least-squares fitting of carrier phase distribution by using a rational function in fringe projection profilometry: erratum," Opt. Lett. 32, 487-487 (2007).

Handley, John C., Edward R. Dougherty, Maximum-Likelihood Estimation for the Two-Dimensional Discrete Boolean Random Set and Function Models Using Multidimensional Linear Samples, Graphical Models and Image Processing, vol. 59, Issue 4, Jul. 1997, pp. 221-231, ISSN 1077-3169, http://dx.doi.org/10.1006/gmip.1997.0432.

Harding, Kevin, "Challenges and opportunities for 3D optical metrology: what is needed today from an industry perspective," Proc. SPIE 7066, Two- and Three-Dimensional Methods for Inspection and Metrology VI, 70660F (Aug. 29, 2008).

Huang, Peisen S., et al. "Color-Encoded Digital Fringe Projection Technique for High-Speed three-dimensional Surface Contouring," Optical Engineering vol. 38 No. 6, pp. 1065-1071 (Jun. 1999).

Huang, Peisen S., et al., "High-Speed 3-D Shape Measurement based on Digital Fringe Projection," Optical Engineering vol. 42, No. 1, pp. 163-168 (Jan. 2003).

Huntley, J.M., et al., "Shape Measurement by Temporal Phase Unwrapping and Spatial Light Modulator-based Fringe Projector," SPIE vol. 3100; Sep. 25, 1997; 0277-786X.

Kazovsky, L. G., "Beam position estimation by means of detector arrays," Optical and Quantum Electronics, vol. 13, p. 201-208. (May 1981).

Kinell, Lars, "Multichannel Method for Absolute Shape Measurement Using Projected Fringes," Optics and Lasers in Engineering vol. 41 (2004) pp. 57-71.

Li, E. B., et al., "Multi-Frequency and Multiple Phase-Shift Sinusoidal Fringe Projection for 3D Profilometry," Optics Express vol. 13, No. 5, pp. 1561-1569; Mar. 7, 2005.

(56) References Cited

OTHER PUBLICATIONS

Liu, Kai, "Dual-Frequency Pattern Scheme for High-Speed 3-D Shape Measurement," Optics Express, vol. 18, No. 5, pp. 5229-5244, Mar. 1, 2010.
Mermelstein, Michael S., et al., "Video-rate Surface Profiling with Acousto-Optic Accordion Fringe interferometry," Optical Engineering vol. 39, No. 1, pp. 106-113, Jan. 2000.
Pan, Jiahui, et al., "Color Phase-Shifting Technique for three-Dimensional Shape Measurement," Optical Engineering vol. 45, No. 1, 013602, Jan. 2006.
Peng, Xiang, et al., "Three-Dimensional Vision with Dual Acousto-optic Deflection Encoding," Optics Letters, vol. 30, No. 15, pp. 1965-1967, Aug. 1, 2005.
Sainov, Ventseslav, et al., "Real Time Phase Stepping Pattern Projection Profilometry," Proc. of SPIE, vol. 6341, Sep. 15, 2006.
Salvi, Joaquim, et al., "Pattern Codification Strategies in Structured Light Systems," Pattern Recognition the Journal of the Pattern Recognition Society, vol. 37 (2004), pp. 827-849.
Schirripa-Spagnolo, Giuseppe and Dario Ambrosini, "Surface contouring by diffractive optical element-based fringe projection," Measurement Science and Technology 12, N6 (2001).
Skydan, Oleksandr, et al., "Technique for Phase Measurement and Surface Reconstruction by Use of Colored Structured Light," Applied Optics, vol. 41, No. 29, Oct. 10, 2002.
Stoykova, Elena, et al., "Pattern Projection with a Sinusoidal Phase Grating," Hindawi Publishing Corporation EURASIP Journal on Advances in Signal Processing, vol. 2009, article ID 351626, 10 pages, May 13, 2008.
Su, Wei-Hung, Cho-Yo Kuo, Chun-Chieh Wang, and Chung-Fan Tu, "Projected fringe profilometry with multiple measurements to form an entire shape," Opt. Express 16, 4069-4077 (2008).
Wang, Yongchang, et al., "Maximum SNR Pattern Strategy for Phase Shifting Methods in Structured light Illumination," Journal Optical Society of America, vol. 27, No. 9, pp. 1962-1971, Sep. 2010.
Wyant, J. "Computerized interferometric surface measurements [Invited]," Appl. Opt. 52, 1-8 (2013).
Yin, Xuebing, et al., "Acoustic Grating Fringe Projector for High-Speed and High-Precision three-Dimensional Shape Measurements," Applied Optics, vol. 46, No. 15, pp. 3046-3051, May 20, 2007.
Zhang, Song, "Recent progresses on Real-Time 3D Shape Measurement Using Digital Fringe Projection Techniques," Journal Optics and Lasers in Engineering, Elsevier, 0143-8166, Mar. 8, 2009.
International Search Report, PCT/US2009/049978, dated Jan. 17, 2010, EPO.
Written Opinion, PCT/US2009/049978, dated Jan. 8, 2011, EPO.
1st Office Action, German Appl. No. 112009001652.9, dated Jul. 23, 2017, German Patent Office.
Non-Final Office Action, U.S. Appl. No. 12/499,758, dated Nov. 29, 2012, USPTO.
Notice of Allowance, U.S. Appl. No. 12/499,758, dated May 7, 2013, USPTO.
Non-Final Office Action, U.S. Appl. No. 13/961,397, dated Oct. 29, 2013, USPTO.
Notice of Allowance, U.S. Appl. No. 13/961,397, dated May 8, 2014, USPTO.
Non-Final Office Action, U.S. Appl. No. 14/455,039, dated Sep. 21, 2016, USPTO.
Notice of Allowance, U.S. Appl. No. 14/455,039, dated Feb. 28, 2017, USPTO.
Notice of Allowance, U.S. Appl. No. 14/643,966, dated Sep. 23, 2016, USPTO.
Restriction Requirement, U.S. Appl. No. 15/389,804, dated Jun. 22, 2017, USPTO.
Non-Final Office Action, U.S. Appl. No. 15/389,804, dated Oct. 16, 2017, USPTO.
Notice of Allowance, U.S. Appl. No. 15/389,804, dated Apr. 13, 2018, USPTO.
Non-Final Office Action, U.S. Appl. No. 15/607,602, dated Sep. 11, 2018, USPTO.
Notice of Allowance, U.S. Appl. No. 15/607,602, dated Mar. 7, 2019, USPTO.
European Search Report and Search Opinion, European Appl. No. 18189419.7, dated Nov. 29, 2018, EPO.
Non-Final Office Action, U.S. Appl. No. 16/034,485, dated Sep. 7, 2018, USPTO.
Notice of Allowance, U.S. Appl. No. 16/034,485, dated Jan. 9, 2019, USPTO.
Non-Final Office Action, U.S. Appl. No. 16/377,434, dated Jul. 30, 2019, USPTO.
Notice of Allowance, U.S. Appl. No. 16/377,434, dated Dec. 11, 2019, USPTO.

\* cited by examiner

CODING DISTANCE TOPOLOGIES FOR STRUCTURED LIGHT PATTERNS FOR 3D RECONSTRUCTION

CROSS-REFERENCES TO RELATED APPLICATIONS

This application is a non-provisional patent application claiming priority benefit of U.S. provisional patent application Ser. No. 62/547,777, filed on Aug. 19, 2017 and entitled "CODING DISTANCE TOPOLOGIES FOR STRUCTURED LIGHT PATTERNS FOR 3D RECONSTRUCTION," the entire disclosure of which is herein incorporated by reference for all purposes.

BACKGROUND 3D locations may be obtained using a wide range of spatial pattern features including dots, lines, fringes, etc. Various modulations of these features including phase, amplitude, position, etc., may be utilized to encode measurement information within the spatial pattern. One class of pattern encoding, for example, may discuss how the pattern may include additional codeword information to identify individual features within the pattern.

There may thus be a need for tools and techniques that may go beyond the current use of pattern encoding with information.

BRIEF SUMMARY

Methods, systems, and devices for 3D measurement and/or pattern generation are provided in accordance with various embodiments. Different embodiments relate in general to devices, systems, and methods for projecting structured light patterns and 3D measurement.

For example, some embodiments include a system for 3D measurement that may include a pattern projector that emits one or more patterns. Each pattern from the one or more patterns may include an arrangement of three or more symbols that are arranged such that for each symbol in the arrangement, a degree of similarity between said symbol and a most proximal of the remaining symbols in the arrangement is less than a degree of similarity between said symbol and a most distal of the remaining symbols in the arrangement. The system may include an imager. The system may include a processor that estimates one or more 3D locations on an object based on at least: illuminating the object using the one or more patterns projected from the pattern projector; collecting one or more images of the illuminated object using the imager; and/or computing the one or more 3D locations on the object based on the one or more projected patterns and the one or more collected images.

In some embodiments of the system, the three of more symbols include three or more spatial codewords. In some embodiments, the three or more symbols are arranged such that for each symbol in the arrangement, a degree of similarity between said symbol and a more proximal of the remaining symbols in the arrangement is less than a degree of similarity between said symbol and a more distal of the remaining symbols in the arrangement. In some embodiments, a most proximal symbol pair from the three or more symbols has a larger Hamming distance than a most distal symbol pair from the three or more symbols.

In some embodiments of the system, the arrangement of three or more symbols is repeated. In some embodiments, a width of the arrangement of three or more symbols is wide enough such that no two regions of the object are illuminated by a same symbol pair from the three or more symbols and collected on the one or more images. In some embodiments, the pattern projector illuminates the object limited to a specific range of distances. In some embodiments, at least the pattern projector, the imager, or the processor is dynamically configured for one or more working ranges.

In some embodiments of the system, an assessment of the most proximal of the remaining symbols from the arrangement and the most distal of the remaining symbols from the arrangement occurs along a single direction. In some embodiments, all symbol pairs from the three or more symbols with a proximity less than a block width have a Hamming distance that exceeds the Hamming distance of symbol pairs from the three or more symbols with a proximity more than the block width. In some embodiments, at least the pattern projector, the imager, or the processor is dynamically configured for one or more working ranges such that for each of the one or more working ranges, computing each respective 3D location on the object from the one or more 3D locations utilizes information about a region of the pattern no wider than a block width.

Some embodiments include a pattern projection device that may include one or more pattern generators that emit one or more patterns. Each pattern from the one or more patterns may include an arrangement of three or more symbols that are arranged such that for each symbol in the arrangement, a degree of similarity between said symbol and a most proximal of the remaining symbols in the arrangement is less than a degree of similarity between said symbol and a most distal of the remaining symbols in the arrangement.

In some embodiments of the device, the three of more symbols include three or more spatial codewords. In some embodiments, the three or more symbols are arranged such that for each symbol in the arrangement, a degree of similarity between said symbol and a more proximal of the remaining symbols in the arrangement is less than a degree of similarity between said symbol and a more distal of the remaining symbols in the arrangement.

In some embodiments of the device, a most proximal symbol pair from the three or more symbols has a larger Hamming distance than a most distal symbol pair from the three or more symbols. In some embodiments, the arrangement of three or more symbols is repeated. In some embodiments, a width of the arrangement of three or more symbols is wide enough such that no two regions of the object are illuminated by a same symbol pair from the three or more symbols. In some embodiments, the one or more pattern generators are configured to illuminate an object limited to a specific range of distances. In some embodiments, the one or more pattern generators are dynamically configured for one or more working ranges.

In some embodiments of the device, an assessment of the most proximal of the remaining symbols from the arrangement and the most distal of the remaining symbols from the arrangement occurs along a single direction. In some embodiments, all symbol pairs from the three or more symbols with a proximity less than a block width have a Hamming distance that exceeds the Hamming distance of symbol pairs from the three or more symbols with a proximity more than the block width.

In some embodiments of the device, the one or more pattern generators are dynamically configured for one or more working ranges such that for each of the one or more working ranges, computing a 3D location on an object utilizes information about a region of the pattern no wider than the block width.

Some embodiments include a method of pattern projection that may include projecting one or more patterns. Each pattern from the one or more patterns may include an arrangement of three or more symbols that are arranged such that for each symbol in the arrangement, a degree of similarity between said symbol and a most proximal of the remaining symbols in the arrangement is less than a degree of similarity between said symbol and a most distal of the remaining symbols in the arrangement.

Some embodiments of the method may further include: illuminating an object using the one or more projected patterns; collecting one or more images of the illuminated object; and/or computing one or more 3D locations of the illuminated object based on the one or more projected patterns and the one or more collected images.

In some embodiments of the method, the three of more symbols include three or more spatial codewords. In some embodiments, symbol pairs from the three or more symbols that are more proximal in the respective pattern from the one or more patterns are less similar than symbol pairs from the three or more symbols that are less distal in the respective pattern of the one or more patterns. In some embodiments, a most proximal symbol pair from the three or more symbols has a larger Hamming distance than a most distal symbol pair from the three or more symbols.

In some embodiments of the method, the arrangement of three or more symbols is repeated. In some embodiments, a width of the arrangement of three or more symbols is wide enough such that no two regions of the object are illuminated by a same symbol pair from the three or more symbols. In some embodiments, the illuminating is configured to illuminate the object limited to a specific range of distances.

Some embodiments of the method include dynamically configuring at least the projecting, the illuminating, the collecting, or the computing for one or more working ranges.

In some embodiments of the method, an assessment of the most proximal of the remaining symbols from the arrangement and the most distal of the remaining symbols from the arrangement occurs along a single direction. In some embodiments, all symbol pairs from the three or more symbols with a proximity less than a block width have a Hamming distance that exceeds the Hamming distance of symbol pairs from the three or more symbols with a proximity more than the block width.

Some embodiments of the method include dynamically configuring at least the projecting, the illuminating, the collecting, or the computing for one or more working ranges such that for each of the one or more working ranges, computing each respective 3D location on the object from the one or more 3D locations utilizes information about a region of the pattern no wider than the block width.

Some embodiments include methods, systems, and/or devices as described in the detailed description and/or shown in the figures.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the different embodiments may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1A:
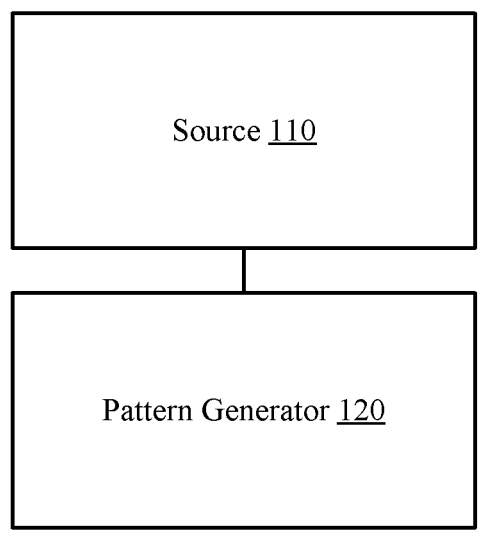
FIG. 1A and FIG. 1B show block diagrams of devices for projecting patterned radiation in accordance with various embodiments.

The ensuing description provides exemplary embodiments only, and is not intended to limit the scope, applicability, or configuration of the disclosure. Rather, the ensuing description of the exemplary embodiments will provide those skilled in the art with an enabling description for implementing one or more exemplary embodiments, it being understood that various changes may be made in the function and arrangement of elements without departing from the spirit and scope of the invention as set forth in the appended claims. Several embodiments are described herein, and while various features are ascribed to different embodiments, it should be appreciated that the features described with respect to one embodiment may be incorporated within other embodiments as well. By the same token, however, no single feature or features of any described embodiment should be considered essential to every embodiment, as other embodiments may omit such features.

Specific details are given in the following description to provide a thorough understanding of the embodiments. However, it will be understood by one of ordinary skill in the art that the embodiments may be practiced without these specific details. For example, systems, networks, processes, and other elements in embodiments may be shown as components in block diagram form in order not to obscure the embodiments in unnecessary detail. In other instances, well-known processes, structures, and techniques may be shown without unnecessary detail in order to avoid obscuring the embodiments.

Also, it is noted that individual embodiments may be described as a process which may be depicted as a flowchart, a flow diagram, a structure diagram, or a block diagram. Although a flowchart may describe the operations as a sequential process, many of the operations can be performed in parallel or concurrently. In addition, the order of the operations may be rearranged. A process may be terminated when its operations may be completed but could also include additional operations not discussed or included in a figure. Furthermore, not all operations in any particularly described process may occur in all embodiments. A process may correspond to a method, a function, a procedure, a subroutine, a subprogram, etc. When a process corresponds to a function, its termination corresponds to a return of the function to the calling function or the main function.

Furthermore, embodiments may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine-readable medium. A processor(s) may perform the necessary tasks.

Methods, systems, and devices involving patterned radiation are provided in accordance with various embodiments. Some embodiments include a device for projecting pattern radiation. Some embodiments include a method for computing 3D locations. Some embodiments include a system for 3D measurement. A variety of radiation patterns are provided in accordance with various embodiments. Some embodiments may include 3D-scanning based on structured light.

Errors in 3D reconstruction may occur when the projected structured light pattern may be misrecognized. Some embodiments may utilize error-correcting codes with a specific spatial topology in the projected patterns themselves to decrease the error rate. The use of error-correcting codes in more general communication theory may involve a large separation between any two codewords because the encoded information may take on any ordering. This may involve a condition where there may be no a-priori information. Structured light systems, in contrast, may have a unique set of a-priori conditions such as: (a) the encoded pattern may have a static codeword order; (b) the geometry of the projector/camera assembly; (c) and/or the likely shape of the scene that may be imaged. Because of (b) and/or (c), it may be more important to guarantee good error-correcting capabilities in a local neighborhood around each symbol. Because the codewords may be arranged in a static order (a), some embodiments may design that order to enhance the error-correcting capabilities around the local neighborhood. In some embodiments, this may lead to more effective designs of error-correcting codes.

Some embodiments include a projected pattern for 3D systems that may include symbols (e.g., codewords) in a particular order. Each symbol may be more different to symbols immediately adjacent to that symbol than the symbol may be to other symbols that may be further separated within the pattern. Merely by way of example, consider a case of four symbols 'O', 'D', 'P', and 'I', where O may be more similar to D than it may be to P or I. In this case, O may be adjacent to P or I and may not be adjacent to D. This same relationship may be maintained for each symbol in the entire pattern. One embodiment of this pattern may be: DIOP. O may thus be adjacent to dissimilar symbols P and I. Moreover, 'I' may be adjacent to dissimilar symbol 'D'.

Spatial topology of symbol encoding in accordance with various embodiments may be applicable to the entire field of structured illumination. This may include multi-pattern methods that may use temporal codewords as well as single pattern methods that may use spatial codewords.

Figure 1B:
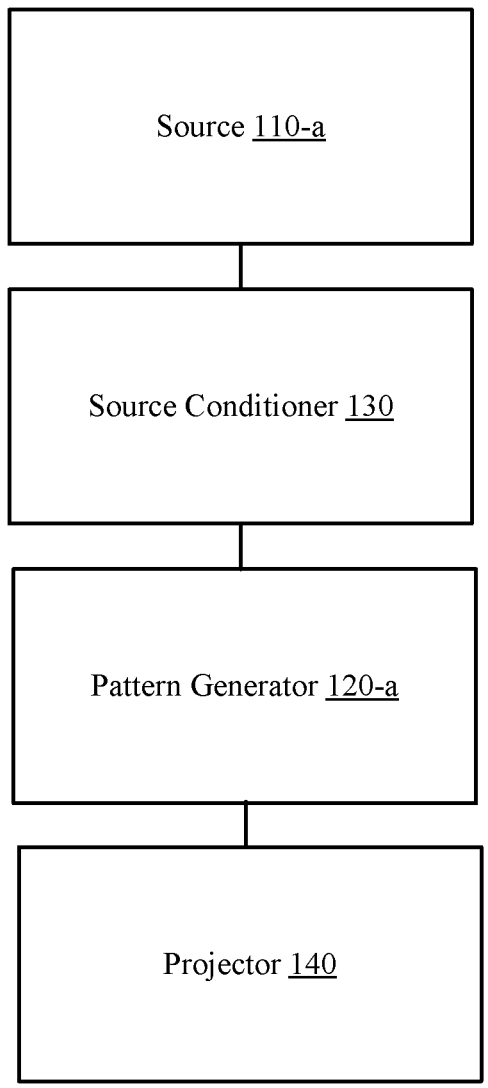

Turning now to FIG. 1A and FIG. 1B, various devices in accordance to various embodiments are provided. Some embodiments may include a device 100 for projecting patterned radiation as shown in FIG. 1A. The radiation pattern may include multiple symbols. One example of the symbols may include spatial codewords. Device 100 may be referred to as a pattern projection device or a pattern projector in some embodiments.

According to some embodiments illustrated in FIG. 1A, the device 100 for projecting patterned radiation may include a pattern generator 120. Additionally, the device 100 may include a source of radiation 110. In some embodiments, the source 110 may be integrated with the pattern generator 120, or the source 110 itself may generate the radiation pattern directly. In another embodiment, shown in FIG. 1B, a device 100-*a* for projecting patterned radiation may include a source of radiation 110-*a*, one or more source conditioners 130 for conditioning the radiation, one or more pattern generators 120-*a*, and/or one or more projectors 140 (which may be referred to as projection elements in some embodiments). Device 100-*a* may be referred to as pattern projection device and/or pattern projector in some embodiments. Device 100-*a* may be an example of device 100 of FIG. 1A. The source conditioner(s) 130 may collect, collimate, focus, shape, split, amplify, redirect, redistribute, and/or otherwise condition the radiation of the radiation emitted by the source 110-*a*. While the pattern generator 120-*a* may emit a radiation pattern directly, in some embodiments one or more projectors 140 may be used to relay, magnify, distort, reshape, focus, and/or otherwise project the radiation pattern. In some embodiments, the output of the pattern generator 120-*a* may involve modification by one or more additional elements to produce the desired radiation pattern. Note that other embodiments may exclude one or more elements shown in the device 100-*a*, while other embodiments may include additional elements. In some embodiments, the radiation pattern may be projected onto an object and/or scene, for example. Pattern generator 120-*a* may be an example of pattern generator 120 of FIG. 1A; source 110-*a* may be an example of source 110 of FIG. 1A.

In general, device 100 and/or device 110-*a* may be configured for projecting patterned radiation. Device 100 and/or device 100-*a* may include pattern generators 120 and 120-*a*, respectively, as noted above, which may be configured to produce one or more patterns. Each pattern from the one or more patterns may include an arrangement of three or more symbols that may be arranged such that for each symbol in the arrangement, a degree of similarity between said symbol and a most proximal of the remaining symbols in the arrangement is less than a degree of similarity between said symbol and a most distal of the remaining symbols in the arrangement.

In some embodiments of the device 100 and/or device 100-a, the three of more symbols include three or more spatial codewords. In some embodiments, the three or more symbols are arranged such that for each symbol in the arrangement, a degree of similarity between said symbol and a more proximal of the remaining symbols in the arrangement is less than a degree of similarity between said symbol and a more distal of the remaining symbols in the arrangement.

In some embodiments of the device 100 and/or 100-a, a most proximal symbol pair from the three or more symbols has a larger Hamming distance than a most distal symbol pair from the three or more symbols. In some embodiments, the arrangement of three or more symbols is repeated. In some embodiments, a width of the arrangement of three or more symbols is wide enough such that no two regions of the object are illuminated by a same symbol pair from the three or more symbols. In some embodiments, the one or more pattern generators 120 and/or 120-a are configured to illuminate an object limited to a specific range of distances. In some embodiments, the one or more pattern generators 120 and/or 120-a are dynamically configured for one or more working ranges.

In some embodiments of the device 100 and/or 100-a, an assessment of the most proximal of the remaining symbols from the arrangement and the most distal of the remaining symbols from the arrangement occurs along a single direction. In some embodiments, all symbol pairs from the three or more symbols with a proximity less than a block width have a Hamming distance that exceeds the Hamming distance of symbol pairs from the three or more symbols with a proximity more than the block width.

In some embodiments of the device 100 and/or 100-a, the one or more pattern generators 120 and/or 120-a are dynamically configured for one or more working ranges such that for each of the one or more working ranges, computing a 3D location on an object utilizes information about a region of the pattern no wider than the block width.

In some embodiments of device 100 and/or device 100-a, the radiation source 110 and/or 110-a includes a laser diode, an array of vertical-cavity surface-emitting lasers, a light-emitting diode, and/or a lamp. In some embodiments of device 100 and/or 100-a, the pattern generator 120 and/or 120-a includes at least a mask, a diffractive optical element, and/or a hologram.

Figure 2:
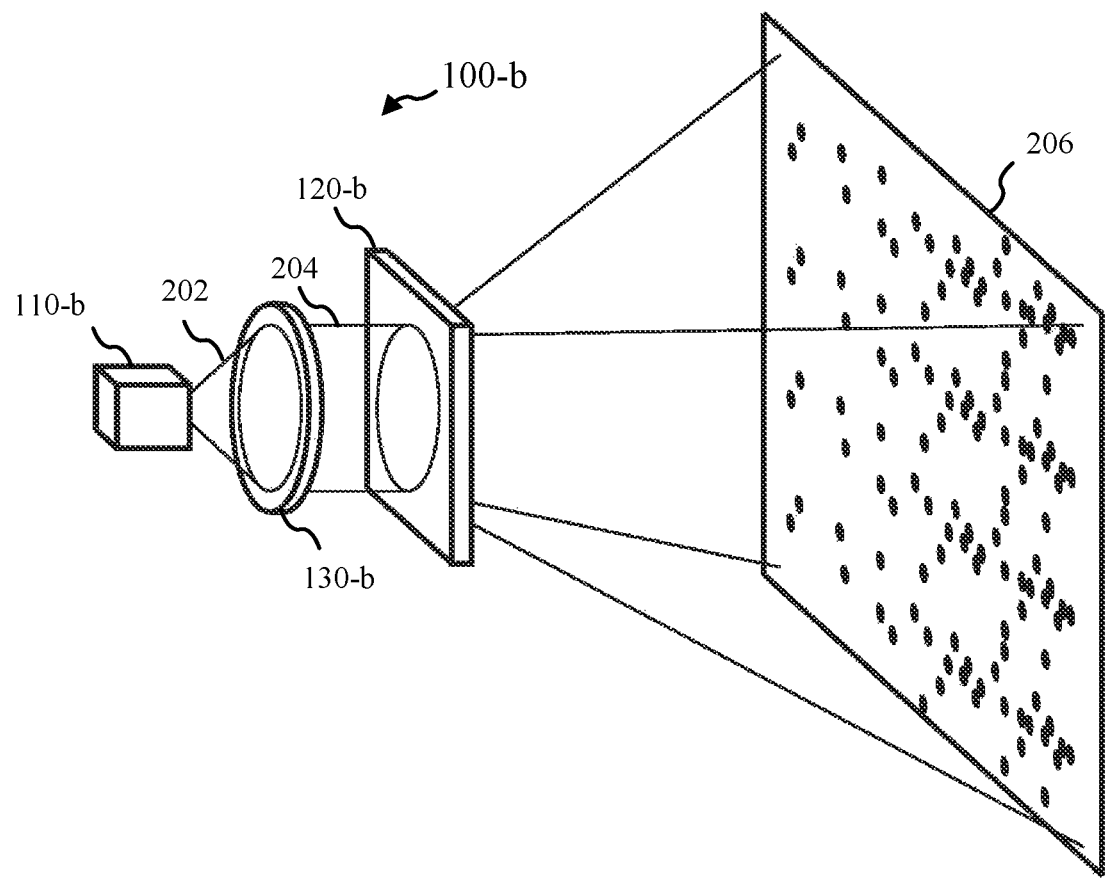
FIG. 2 shows a pattern projection device where a pattern generator may include a diffractive optical element in accordance with various embodiments.

FIG. 2 illustrates an embodiment of a device 100-b for projecting patterned radiation, which may be an example of the device 100 shown in FIG. 1A and/or device 100-a of FIG. 1B, for example. In the embodiment of FIG. 2, which is described here as merely an example, the device 100-b may include a source of radiation 110-b. In some embodiments, the radiation source 110-b may be a laser diode that emits near-infrared radiation 202. In other embodiments, the radiation 202 may be visible. The radiation 202 emitted by the source 110-b may be diverging. A lens 130-b, which may be an example of a source conditioner 130 of FIG. 1B, may be included to convert the diverging radiation 202 into a collimated radiation beam 204. The collimated radiation beam 204 may be incident on a diffractive optical element (DOE) 120-b. The DOE 120-b may be an example of the pattern generator 120 of FIG. 1A and/or pattern generator 120-a of FIG. 1B. The DOE 120-b may convert the collimated beam 204 into a projected radiation pattern 206. One skilled in the art may recognize that the DOE 120-b may be engineered to convert a collimated beam into a wide variety of radiation patterns, including but not limited to patterns that may include three or more spatial symbols, such as three or more spatial codewords. In some embodiments, each pattern element may be a diffracted order produced by the DOE 120-b. In some embodiments, the radiation pattern 206 may be symmetric about the optical axis of the DOE 120-b. In some embodiments of the DOE 120-b, the DOE 120-b may include multiple DOEs. In some embodiments of the DOE 120-b, the DOE 120-b may be constructed to include a diffractive collimation lens within the DOE 120-b. One skilled in the art may recognize that embodiments of the DOE 120-b may also be replaced with one or more holographic optical elements as the pattern generator. In some embodiments, both the DOE 120-b and the collimating lens 130-b may be replaced by a holographic optical element.

Figure 3:
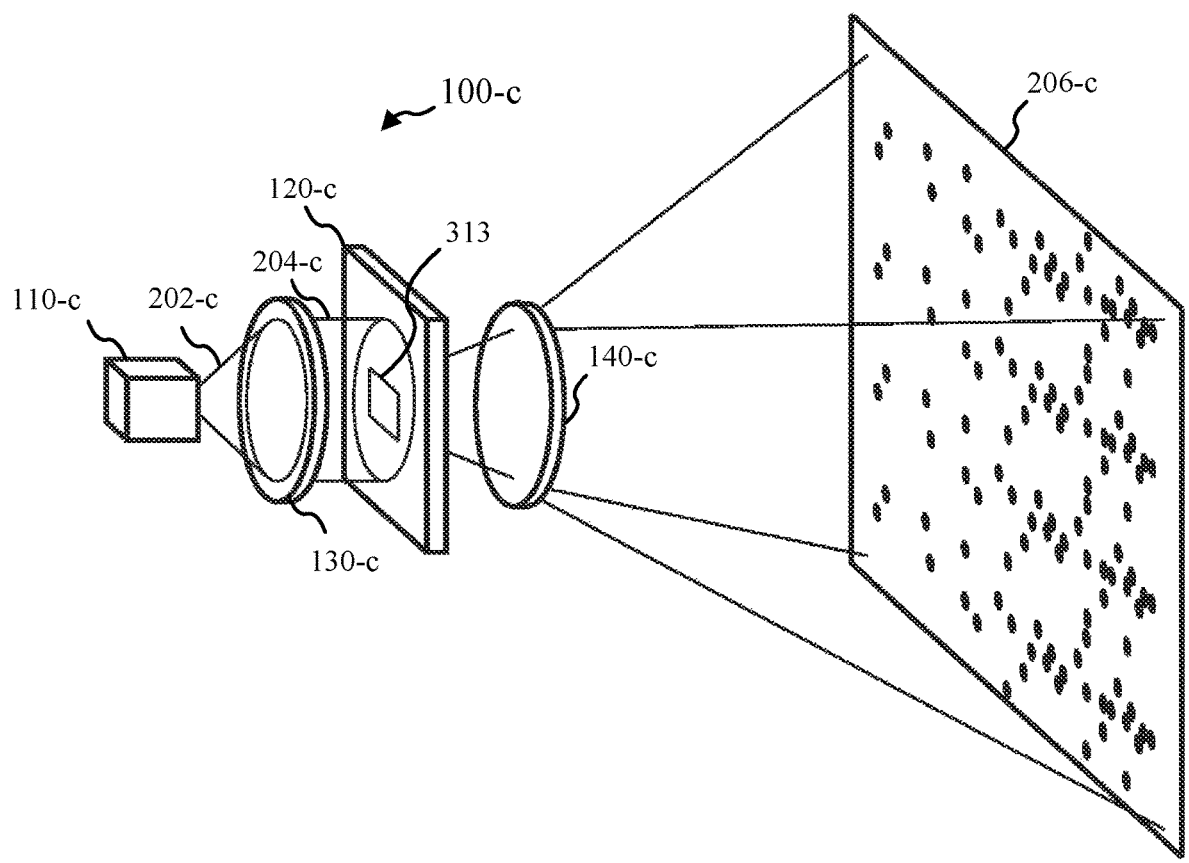
FIG. 3 shows a pattern projection device where a pattern generator may include a mask in accordance with various embodiments.

Referring now to FIG. 3, another embodiment of a device 100-c for projecting patterned radiation is illustrated in accordance with various embodiments. The device 100-c may be an example of the device 100 shown in FIG. 1A or device 100-a of FIG. 1B, for example. In the embodiment of FIG. 3, the device 100-c may include a source of radiation 110-c. In various embodiments, the source 110-c may be a laser, a light-emitting diode, or a lamp. In some embodiments, the source 110-c is an array of vertical-cavity surface-emitting lasers. The radiation 202-c emitted by the source 110-c may be diverging. A condenser lens 130-c may be included to collect the radiation 202-c emitted by the source 110-c. The condenser lens 130-c may be an example of a source conditioner 130 of FIG. 1B, for example. In some embodiments, the condenser lens 130-c may be replaced by a collimating lens. The condenser lens 130-c may output directed radiation 204-c in the direction of a mask 120-c. The mask 120-c may be an example of the pattern generator 120 of FIG. 1A and/or pattern generator 120-a of FIG. 1B, for example. In some embodiments, the mask 120-c may be a binary amplitude mask. In other embodiments, it may be a gray scale mask or a phase mask, for example. In the case of a binary amplitude mask, the mask 120-c may include multiple apertures distributed over an area 313, where each aperture may produce a pattern element. The spatial arrangement of apertures in the mask 120-c may correspond to the arrangement of pattern elements in spatial symbols and to the arrangement of spatial symbols in a projected radiation pattern 206-c. A projection lens 140-c may be included to form an image of the mask 120-c in the far field. The projection lens 140-c may be an example of the projector 140 of FIG. 1B, for example. In some embodiments, the projection lens 140-c may have a small effective aperture in image space to produce an image of the mask 120-c with a large depth of field. The image of the mask 120-c in the far field may be an example of the projected radiation pattern 206-c. The image of the mask 120-c may be projected onto an object or scene in some cases.

Figure 4:
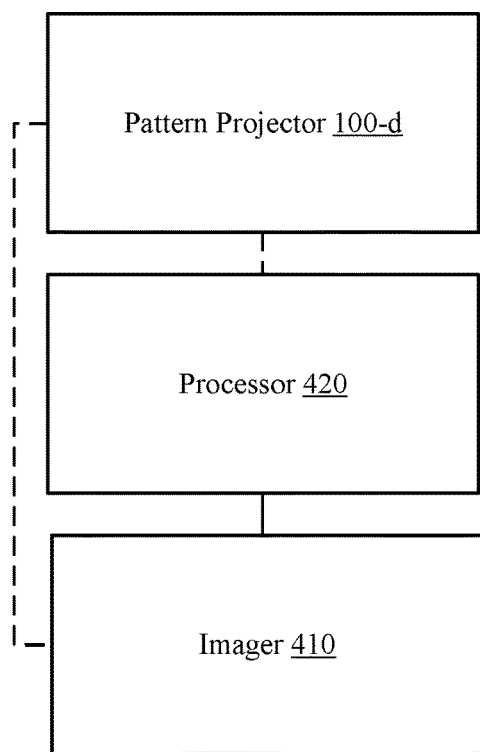
FIG. 4 shows a system for 3D measurement in accordance with various embodiments.

Turning now to FIG. 4, a system 101 for pattern projection and/or 3D measurement is provided in accordance with various embodiments. System 101 may include a pattern projector 100-d for projecting patterned radiation. The pattern projector 100-d may be an example of device 100 of FIG. 1A, device 100-a of FIG. 1B, device 100-b of FIG. 2, and/or device 100-c of FIG. 3. System 101 may also include an imager 410 and/or a processor 420.

In some embodiments of system 101, the pattern projector 100-d is configured to emit one or more patterns. Each pattern from the one or more patterns may include an arrangement of three or more symbols that are arranged such that for each symbol in the arrangement, a degree of similarity between said symbol and a most proximal of the remaining symbols in the arrangement is less than a degree of similarity between said symbol and a most distal of the remaining symbols in the arrangement. In some embodiments of system 101, the imager 410 and/or processor 420 may be configured such that the processor 420 estimates one or more 3D locations on an object based on at least: illuminating an object using the one or more patterns projected from the pattern projector 100-*d*; collecting one or more images of the illuminated object using the imager 410; and/or computing the one or more 3D locations on the object based on the one or more projected patterns and the one or more collected images utilizing the processor 420.

In some embodiments of the system 101, the three of more symbols include three or more spatial codewords. In some embodiments, the three or more symbols are arranged such that for each symbol in the arrangement, a degree of similarity between said symbol and a more proximal of the remaining symbols in the arrangement is less than a degree of similarity between said symbol and a more distal of the remaining symbols in the arrangement. In some embodiments, a most proximal symbol pair from the three or more symbols has a larger Hamming distance than a most distal symbol pair from the three or more symbols.

In some embodiments of the system 101, the arrangement of three or more symbols is repeated. In some embodiments, a width of the arrangement of three or more symbols is wide enough such that no two regions of the object are illuminated by a same symbol pair from the three or more symbols and collected on the one or more images. In some embodiments, the pattern projector 100-*d* illuminates the object limited to a specific range of distances. In some embodiments, at least the pattern projector 100-*d*, the imager 410, or the processor 420 is dynamically configured for one or more working ranges.

In some embodiments of the system 101, an assessment of the most proximal of the remaining symbols from the arrangement and the most distal of the remaining symbols from the arrangement occurs along a single direction. In some embodiments, all symbol pairs from the three or more symbols with a proximity less than a block width have a Hamming distance that exceeds the Hamming distance of symbol pairs from the three or more symbols with a proximity more than the block width. In some embodiments, at least the pattern projector 100-*d*, the imager 410, or the processor 420 is dynamically configured for one or more working ranges such that for each of the one or more working ranges, computing each respective 3D location on the object from the one or more 3D locations utilizes information about a region of the pattern no wider than a block width.

Figure 5A:
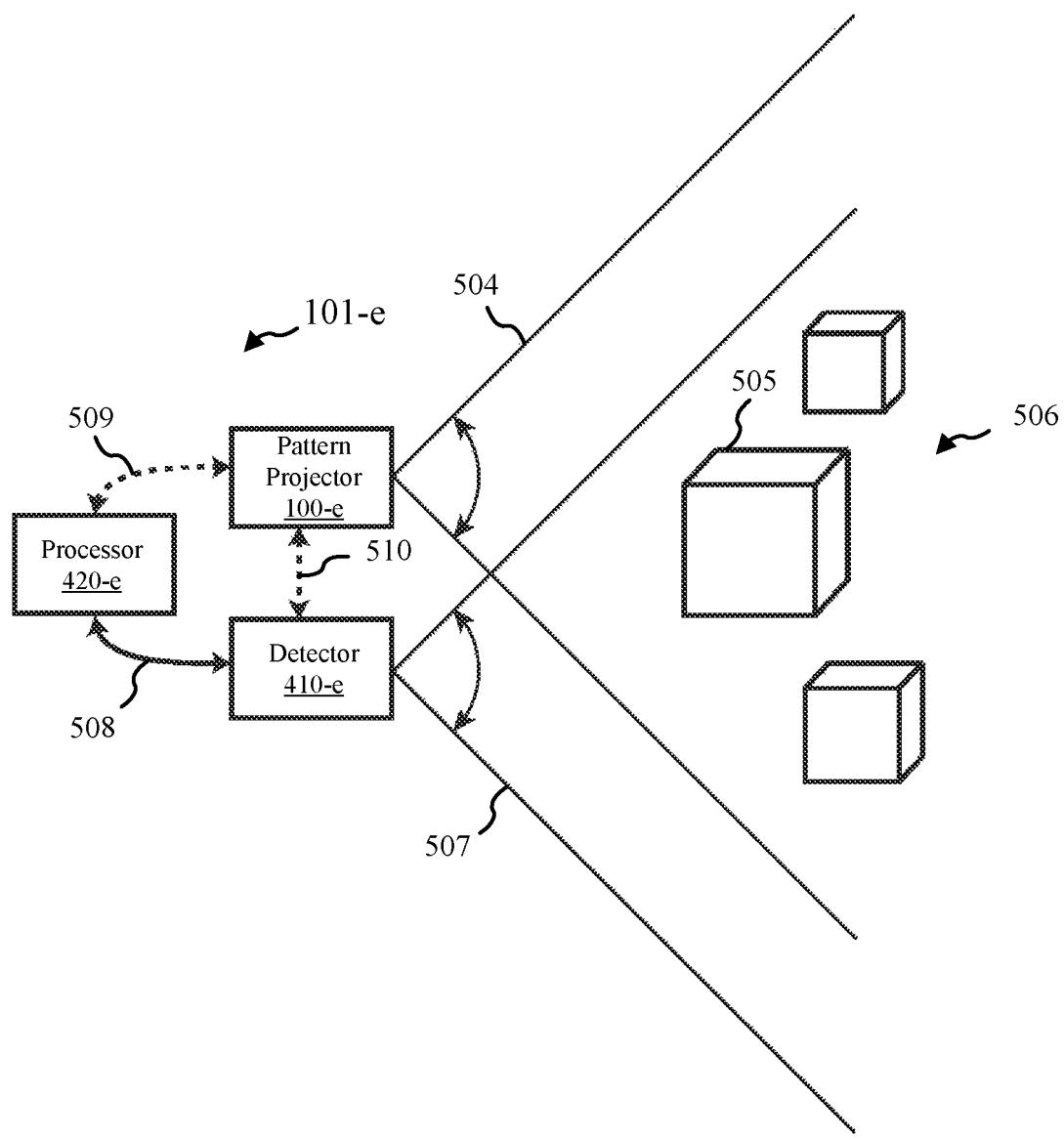
FIG. 5A and FIG. 5B show systems for 3D measurement in accordance with various embodiments.

Turning now to FIG. 5A, a system 101-*e* for pattern projection and/or 3D measurement is provided in accordance with various embodiments. System 101-*e* may be an example of system 101 of FIG. 4. The system 101-*e* may include a device 100-*e* for projecting patterned radiation, which may be referred to as a pattern projector or pattern projection device. The device 100-*e* may be an example of device 100 of FIG. 1A, device 100-*a* of FIG. 1B, device 100-*b* of FIG. 2, device 100-*c* of FIG. 3, and/or device 100-*d* of FIG. 4. The patterned radiation projected by the device 100-*e* may include one or more arrangements of spatial symbols, and those spatial symbols may be distinguishable from one another. In some embodiments, the patterned radiation may include one or more patterns with multiple symbols, such as multiple spatial codewords. Each pattern may include an arrangement of three or more symbols; the symbols may be arranged such that for each symbol in the arrangement, a degree of similarity between said symbol and a most proximal of the remaining symbols in the arrangement is less than a degree of similarity between said symbol and a most distal of the remaining symbols in the arrangement.

The device 100-*e* may emit the patterned radiation, which may include one or more patterns, over a field of view 504. The patterned radiation may be projected onto a three-dimensional scene 506, which may contain one or more objects 505; in some embodiments, the device 100-*e* may illuminate the one or more objects 505. A detector 410-*e* may detect the radiation pattern illuminating at least a portion of the 3D scene 506 and/or one or more objects 505. Detector 410-*e* may be an example of imager 410 of FIG. 4. In some embodiments, the detector 410-*e* may be a camera and/or imaging device that may utilize a charge-coupled device (CCD) detector array and/or a complementary metal-oxide semiconductor (CMOS) detector array. The field of view 507 of the detector 410-*e* may substantially overlap with the field of view 504 of the pattern projector 100-*e*. The detector 410-*e* may form and/or collect one or more images of at least a portion of the scene 506 illuminated by the patterned radiation. A processor 420-*e*, which may be in communication 508 with the detector 410-*e*, may receive the one or more images and process the one or more images. The processor 420-*e* may be an example of the processor 420 of FIG. 4. In some embodiments, the processor 420-*e* computes one or more 3D locations based on information about the projected pattern and information about the collected images. In some embodiments, the processor 420-*e* estimates the coordinates of one or more locations on the surface of one or more objects 505 in the scene 506. In some embodiments, the processor 420-*e* may estimate the coordinates of multiple object points to produce a depth image. The processor 420-*e* may also be in communication 509 with the pattern projector 100-*e*, or the pattern projector 100-*e* may not involve communication with the processor 420-*e* in some cases. Similarly, the pattern projector 100-*e* may be in communication 510 with the detector 410-*e*, or the pattern projector 100-*e* may not involve communication with the detector 410-*e*. In some embodiments, a strobe signal from the detector 410-*e* may be used to activate the pattern projector 100-*e* during the active exposure time of the detector 410-*e*. In some embodiments, the detector 410-*e* may be constructed with a bandpass spectral filter that may collect only the spectral band encompassing the pattern projector source and may reject all other radiation sources.

In the system 101-*e*, the pattern projector 100-*e* may include a radiation source. Examples of radiation sources that may be employed in the pattern projector 100-*e* include, but are not limited to, laser diodes, light-emitting diodes, arrays of VCSELs, other lasers, and/or lamps. The pattern projector 100-*e* may also include a pattern generator, such as a mask, a DOE, and/or a hologram; in some embodiments, the pattern generator may be referred to as a pattern generating element. In some embodiments, the pattern generator may be integrated with the source of radiation. For example, the source of radiation may be an array of VCSELs, where the layout of the VCSELs within the array generates one or more patterns and/or an arrangement of spatial symbols within the one or more patterns. The pattern projector 100-*e*, the detector 410-*e* (e.g., camera), and/or the processor 420-*e* may be integrated together, or one or more of these components may be operated remotely. To estimate the coordinates of one or more locations on one or more objects 505 in the scene 506, in some embodiments, the processor 420-e may detect one or more spatial symbols from multiple spatial symbols within the formed image of the 3D scene. Also, the processor 420-e may locate one or more of the detected spatial symbols within the formed image of the 3D scene. Furthermore, the processor 420-e may identify one or more of the detected spatial symbols. In some embodiments, the processor 420-e may detect one or more pattern elements within the spatial symbols. The processor 420-e may also locate one or more pattern elements within the spatial symbols. Furthermore, the processor 420-e may identify one or more of the detected pattern elements in some cases.

In general, system 101-e may be configured for estimating the coordinates of a location on an object, such as object 505, in a 3D scene, such as scene 506, and/or computing one or more 3D locations in accordance with various embodiments. The system 101-e may include a device for projecting patterned radiation such as pattern projector 100-e. The pattern projector 100-e may include a radiation source. The pattern projector 100-e may include a pattern generator configured to produce a radiation pattern. The radiation pattern may include multiple spatial symbols. The multiple spatial symbols may be configured such that each respective spatial symbol of the multiple spatial symbols may be distinguishable from the other spatial symbols of the multiple spatial symbols. Each radiation pattern may include an arrangement of three or more symbols; the symbols may be arranged such that for each symbol in the arrangement, a degree of similarity between said symbol and a most proximal of the remaining symbols in the arrangement is less than a degree of similarity between said symbol and a most distal of the remaining symbols in the arrangement.

In some embodiments of system 101-e, the three of more symbols include three or more spatial codewords. In some embodiments, the symbols are arranged such that for each symbol in the arrangement, a degree of similarity between said symbol and a more proximal of the remaining symbols in the arrangement is less than a degree of similarity between said symbol and a more distal of the remaining symbols in the arrangement. In some embodiments, a most proximal symbol pair has a larger Hamming distance than a most distal symbol pair.

In some embodiments of system 101-e, the arrangement of three or more symbols is repeated. A width of the arrangement of three or more symbols may be wide enough such that no two regions of the object are illuminated by a same symbol pair and collected on the image. In some embodiments, the pattern projector 100-e is configured to illuminate the object limited to a specific range of distances. In some embodiments, system 101-e is dynamically configured for one or more working ranges; this may include dynamically configuring the pattern projector 100-e, the detector 410-e, and/or the processor 420-e. In some embodiments, system 101-e is dynamically configured for one or more working ranges such that for each of the one or more working ranges the process of computing a 3D location out of the one or more 3D locations utilizes information about a region of the pattern no wider than the block width.

In some embodiments of system 101-e, an assessment of the most proximal and most distal occurs along a single direction. In some embodiments, all symbol pairs with a proximity less than a block width have a Hamming distance that exceeds the Hamming distance of symbol pairs with a proximity more than the block width.

In some embodiments, the detector 410-e, such as a camera, may be configured to detect the radiation pattern illuminating at least a portion of the 3D scene 506 and/or one or more objects 505. The processor 420-e may be configured to estimate the coordinates of the location on the object in the 3D scene 506 based on the detected radiation pattern and/or compute one or more 3D locations based on the information about the one or more projected patterns and information about the collected images.

In some embodiments of system 101-e, the radiation source of pattern projector 100-e includes at least a laser diode, an array of vertical-cavity surface-emitting lasers, a light-emitting diode, or a lamp. In some embodiments, the pattern projector 100-e includes at least a mask, a diffractive optical element, or a hologram.

In some embodiments of system 101-e, the pattern projector 100-e, the detector 410-e, and/or the processor 420-e are embedded within a mobile electronic device. In some embodiments, the pattern projector 100-e, the detector 410-e, and/or the processor 420-e are operated remotely.

Figure 5B:
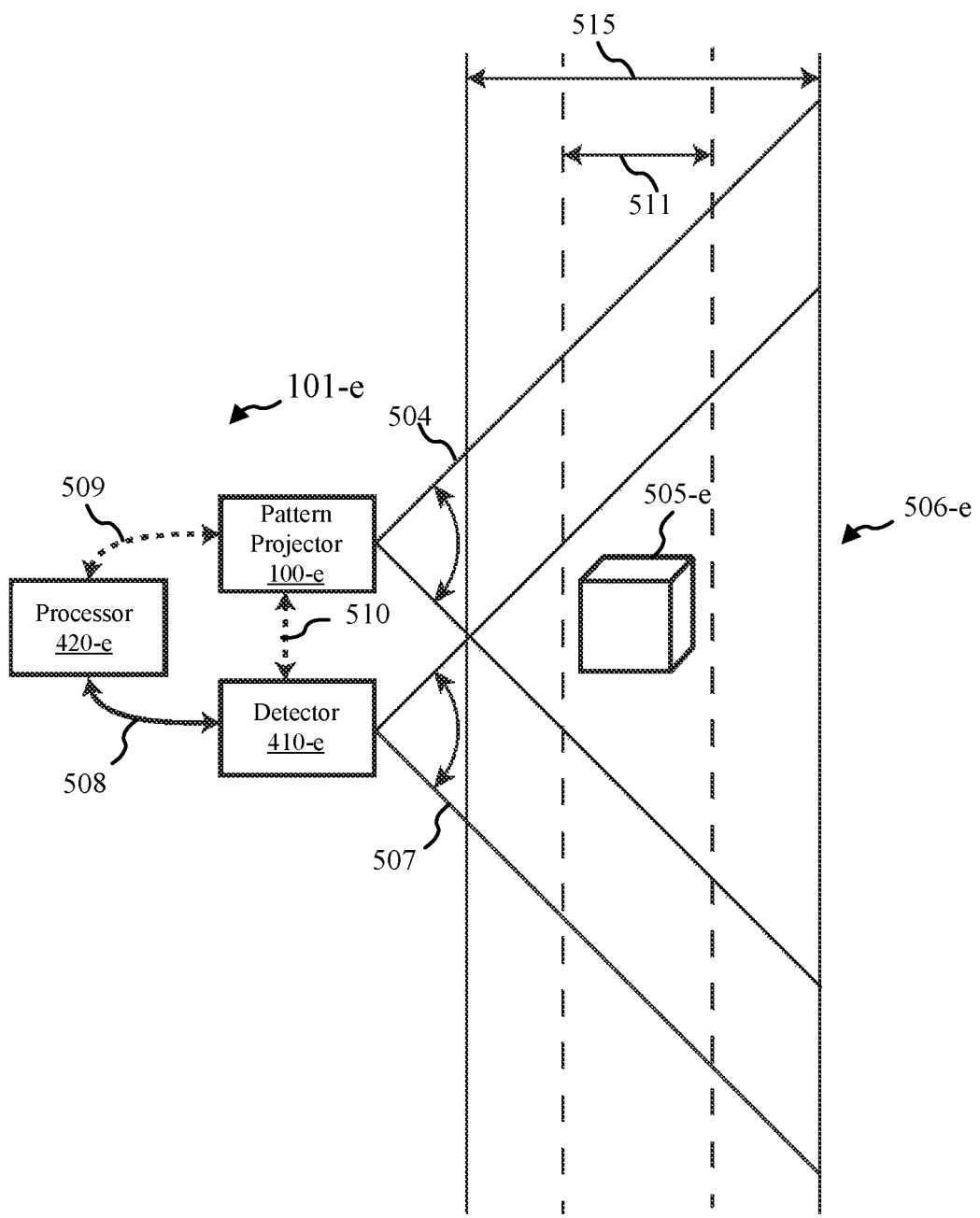

FIG. 5B provides an example of system 101-e configured for estimating coordinates of a location on an object in a 3D scene in accordance with various embodiments. In this example, the illumination pattern projected by the pattern projector 100-e may include an arrangement of symbols. For any given symbol in the arrangement of symbols, the most proximal of the remaining symbols may have a low degree of similarity to the given symbol relative to the most distal of the remaining symbols, which may have a higher degree of similarity to the given symbol. Furthermore, in some embodiments, the stated relationship between proximity and similarity may exist only in a single direction, such as horizontally, within the projected pattern. In some embodiments, for any given symbol in the arrangement of symbols, neighboring symbols within a given block width may have a low degree of similarity when compared to the given symbol. Symbols that appear outside of the block size, or distance, may have a higher degree of similarity when compared to the given symbol.

In some embodiments, the system 101-e may be capable of estimating locations on the object 505-e in a 3D scene 506-e that extends over a range of distances 515 from the system. To operate over this full range, the process of estimating the 3D locations may include detecting a symbol in the acquired image. This process may also include identifying the symbol. To identify the symbol, the detected symbol may be compared to the projected symbols. Because of noise or other factors, the detected symbol may not match a projected symbol exactly. Instead, the detected symbol may be similar to one or more projected symbols. When operating over the full range of distances 515, the detected symbol may need to be compared to all projected symbols and may exhibit a degree of similarity to more than one, making the symbol identification process error prone. For some applications, however, one or more objects of interest 505-e may lie over a reduced range of distances 511. When operating over this reduced range of distances 511, the detected symbol may need to be compared to a set of symbols within a block width. In this case, because all symbols within the block may exhibit low similarity to each other, a lower degree of similarity between the detected symbol and one of the symbols within the block may be required to correctly identify the symbol. Because each symbol in the pattern lies at the center of a block the reduced range of working distances 511 can be dynamically adjusted to be nearer to or farther from the system 101-e, while maintaining the advantage of utilizing symbol comparisons only within a block.

In some embodiments, the arrangement of symbols may include rows or columns of symbols. In some such cases the degree of similarity of symbols within the arrangement may be engineered according to embodiments along rows, or columns, or both. In some embodiments, each row may include an identical arrangement of symbols, and within each row the symbols may be arranged such that for each symbol, proximal symbols may be less similar and distal symbols may be more similar. In another embodiment based on rows of symbols, each symbol may have a fixed number of neighbors within the row on each side, all of which may have a degree of similarity to the given symbol that is below a threshold value. For concreteness, and merely by way of example, the arrangement of symbols may include rows of seven symbols each. For reference, one may label the symbols in order, left to right, as A, B, C, D, E, F, G. Let the operator s( ) denote degree of similarity, and let t be a threshold similarity value. In this example, the fixed distance within which neighbors may have a similarity value less than t may be a distance two symbols. Hence, considering symbol A: $s(A,B)<t$, $s(A,C)<t$, $s(A,D)>t$, $s(A,E)>t$, $s(A,F)>t$, $s(A,G)>t$.

Likewise, examining the remaining symbols in turn:
B: $s(B,A)<t$, $s(B,C)<t$, $s(B,D)<t$, $s(B,E)>t$, $s(B,F)>t$, $s(B,G)>t$;
C: $s(C,A)<t$, $s(C,B)<t$, $s(C,D)<t$, $s(C,E)<t$, $s(C,F)>t$, $s(C,G)>t$;
D: $s(D,A)>t$, $s(D,B)<t$, $s(D,C)<t$, $s(D,E)<t$, $s(D,F)<t$, $s(D,G)>t$;
E: $s(E,A)>t$, $s(E,B)>t$, $s(E,C)<t$, $s(E,D)<t$, $s(E,F)<t$, $s(E,G)>t$;
F: $s(F,A)>t$, $s(F,B)>t$, $s(F,C)>t$, $s(F,D)<t$, $s(F,E)<t$, $s(F,G)<t$;
G: $s(G,A)>t$, $s(G,B)>t$, $s(G,C)>t$, $s(G,D)>t$, $s(G,E)<t$, $s(G,F)<t$;
In this embodiment, each symbol lies at the center of a block of 5 symbols where each symbol that is not the central symbol in the block has a degree of similarity to the central symbol that is less than the threshold.

In another embodiment with repeating rows, some symbols may repeat in each row while maintaining the same proximal similarity features of the preceding example. Merely by way of example, each row may have 9 total symbols and 7 unique symbols labeled A, B, C, D, E, F, G, A, B. In this example, the pairwise similarity may be:
A: $s(A,B)<t$, $s(A,C)<t$, $s(A,D)>t$, $s(A,E)>t$, $s(A,F)<t$, $s(A,G)<t$.
B: $s(B,A)<t$, $s(B,C)<t$, $s(B,D)<t$, $s(B,E)>t$, $s(B,F)>t$, $s(B,G)<t$;
C: $s(C,A)<t$, $s(C,B)<t$, $s(C,D)<t$, $s(C,E)<t$, $s(C,F)>t$, $s(C,G)>t$;
D: $s(D,A)>t$, $s(D,B)<t$, $s(D,C)<t$, $s(D,E)<t$, $s(D,F)<t$, $s(D,G)>t$;
E: $s(E,A)>t$, $s(E,B)>t$, $s(E,C)<t$, $s(E,D)<t$, $s(E,F)<t$, $s(E,G)>t$;
F: $s(F,A)>t$, $s(F,B)>t$, $s(F,C)>t$, $s(F,D)<t$, $s(F,E)<t$, $s(F,G)<t$;
G: $s(G,A)>t$, $s(G,B)<t$, $s(G,C)>t$, $s(G,D)>t$, $s(G,E)<t$, $s(G,F)<t$;

In some embodiments, the total number of symbols may be more or less than 9 symbols. In some embodiments, the total number of symbols in a row is 96 symbols. Similarly, the total number of unique symbols in a row may be more or less than 7 symbols. In some embodiments, the number of unique symbols in a row is 32 symbols. Furthermore, the block width may be more or less than 5 symbols. In some embodiments, the block width is 23 symbols.

Figure 6:
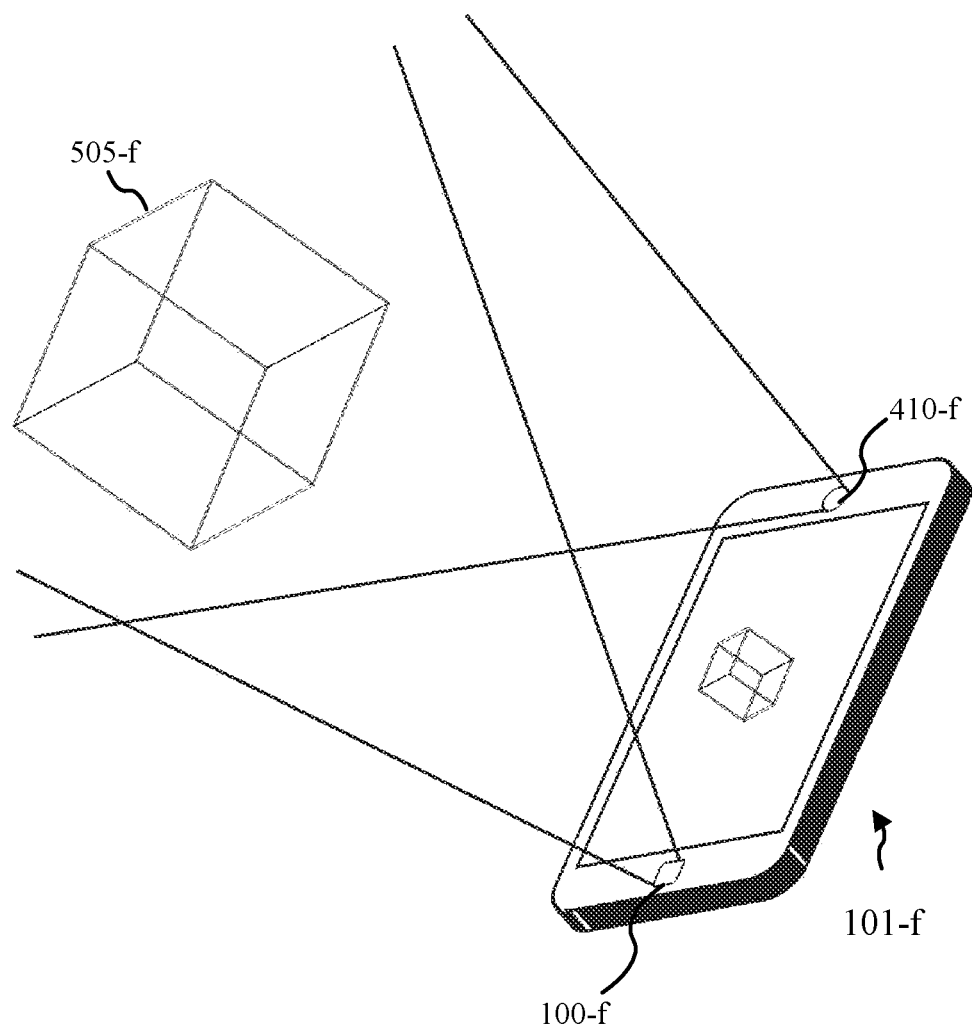
FIG. 6 shows a system embedded in a mobile device, such as a mobile phone, in accordance with various embodiments.

Turning now to FIG. 6, a system 101-f for estimating the coordinates of a location on an object 505-f in a 3D scene in accordance with various embodiments. System 101-f may be an example of system 101 of FIG. 4 and/or system 101-e of FIG. 5A or FIG. 5B, for example. The system 101-f may include, or be embedded in, a mobile electronic device, for example, though the system 101-f may be included and/or embedded in other devices. Examples of such a mobile electronic device include, but are not limited to, a mobile telephone, a smartphone, a tablet computer, a laptop computer, and/or another mobile electronic device. The system 101-f may include a device 100-f for projecting patterned radiation, which may be referred to as a pattern projector. Device 100-f may include a pattern generator configured to produce a radiation pattern, where the radiation pattern may include a multiple spatial symbols, such as three or more codewords. Device 100-f may be an example of device 100 of FIG. 1A, device 100-a of FIG. 1B, device 100-b of FIG. 2, device 100-c of FIG. 3, device 100-d of FIG. 4, and/or device 100-e of FIG. 5A and/or FIG. 5B. The system 101-f may also include one or more detectors 410-f, which may also be referred to as an imager, that may be configured to detect the radiation pattern illuminating at least a portion of the 3D scene. Detector 410-f may be an example of imager 410 of FIG. 4 and/or detector 410-e of FIG. 5A and/or FIG. 5B. In some embodiments, the one or more detectors 410-f may be a digital camera, for example. The system 101-f may also include one or more processors (not shown, though housed within system 101-f) that may be configured to estimate the coordinates of the location on the object in the 3D scene based on the detected radiation pattern. In some embodiments, the one or more processors may be one or more processors present in the mobile electronic system 101-f. In other embodiments, the processor may be an application-specific integrated circuit (ASIC), a field-programmable gate array (FPGA), a digital signal processor (DSP) chip, a central processing unit (CPU), a graphics processing unit (GPU), another type of processor, and/or various combinations of processor types. In some embodiments, the one or more processors may be dedicated to coordinate estimation, whereas in other embodiments the one or more processors may perform other tasks as well. In some cases, the one or more processors may process the resulting coordinate data for purposes such as object detection, object identification, object inspection, object scanning, gesture recognition, facial recognition, tracking, targeting, locating, and/or other purposes. In some embodiments, one or more of the devices 100-f for projecting one or more patterned radiations, the one or more detectors 410-f, and/or the one or more processors may not be embedded in a mobile electronic device 101-f, while the other such components are embedded in the mobile electronic device 101-f. An example of such an embodiment may include a system that may transmit the detected radiation pattern data to a remote processor, which may perform the coordinate estimation. In some embodiments, the system 101-f may be integrated with a display system, such as a television, a computer monitor, a virtual reality headset, a heads-up display, a set of smart glasses, a public information console, a tradeshow station, and/or an embedded interocular display.

Figure 7:
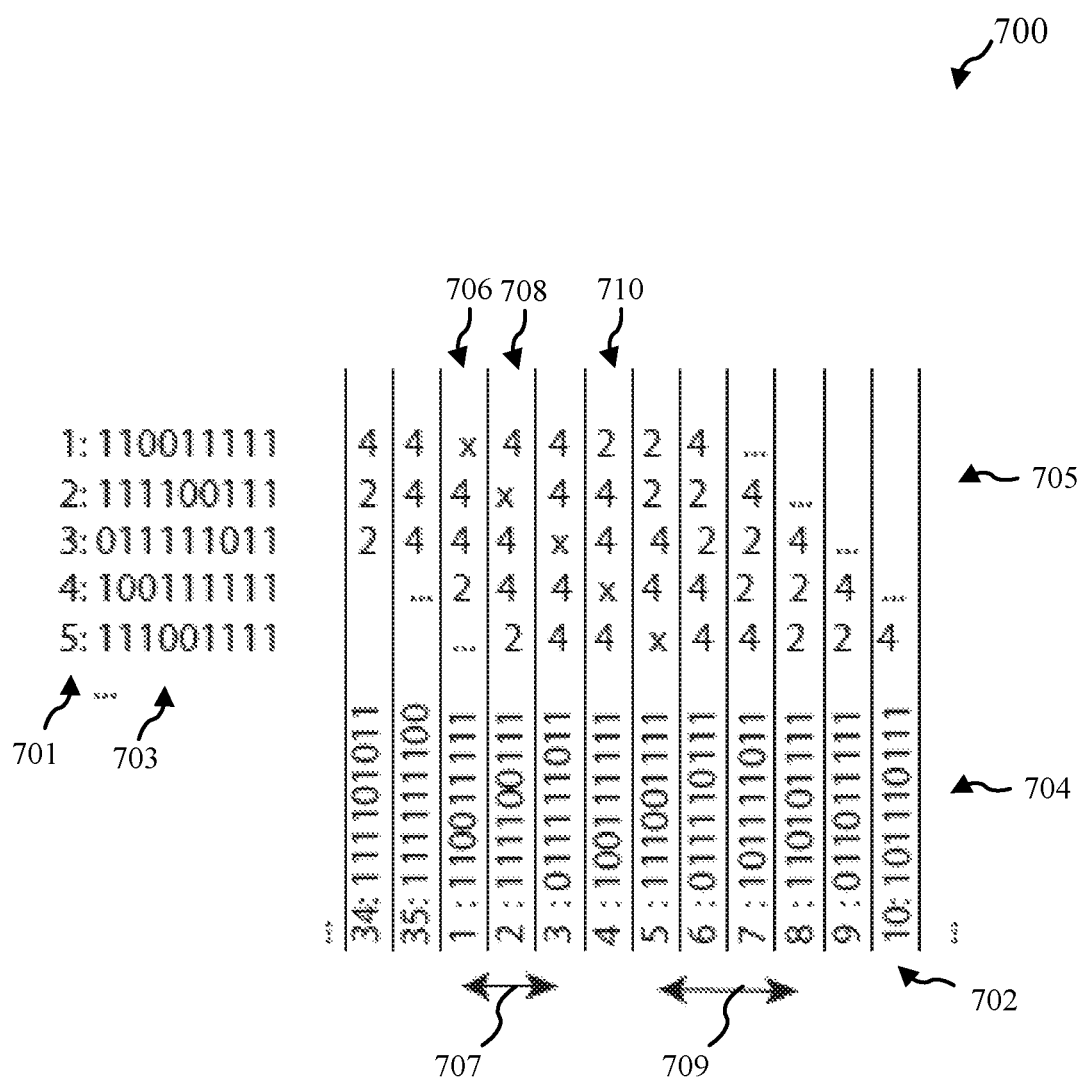
FIG. 7 shows a table in accordance with various embodiments in which symbol similarity may be measured as the Hamming distance between binary codewords.

Turning now to FIG. 7, a table 700 is provided in accordance with various embodiments in which symbol similarity may be measured as the Hamming distance between binary codewords. Table 700 may enumerate the Hamming distances between each symbol in a pattern. High symbol similarity may be indicated by a low Hamming distance and low symbol similarity may be indicated by a high Hamming distance. Devices, systems, and/or methods as shown in FIG. 1A, FIG. 1B, FIG. 2, FIG. 3, FIG. 4, FIG. 5A, FIG. 5B, FIG. 6, FIG. 9, and/or FIG. 10 may implement aspects as related to table 700 in accordance with various embodiments.

The symbol identities may label both the table row 701 and the table column 702 and may be represented by a number value. In some embodiments, the number value may also represent the relative position of each symbol in the spatial pattern. To illustrate Hamming distances, each symbol may be a binary codeword as illustrated in FIG. 7 for each symbol at the table row 703 and table column 704.

Some embodiments may utilize symbols that may include, but are not limited to, a spatial configuration of radiation power density values, a temporal sequence of radiation power density values, a radiation wavelength, a radiation phase, a radiation polarization, a spatial configuration of radiation phases, a temporal sequence of radiation polarizations, and combinations thereof. In such variations, spatial similarity measurements may include, but are not limited to, inner products, sums of differences, and/or hash table mappings.

Table 700 may include a set of symbol similarity values 705. In some embodiments, each symbol similarity value shown may be the Hamming distance between the two symbols corresponding to the binary codewords in the table row 703 and the table column 704. At row-column locations where a symbol similarity may be found by comparing one symbol with itself, 706, a symbol similarity value may be labeled with an 'x' to depict a null difference in the similarity.

In some embodiments, the ordering of the symbol identity numbers 701 and 702 may match the order with which they appear in the projected pattern. In such an embodiment, the symbol-to-symbol proximity may be defined in FIG. 7 as the absolute value of the difference between the label of the table column 702 to the table row 701. For this embodiment, and when the Hamming distance may the measure of spatial similarity, FIG. 7 illustrates an embodiment in which all symbol-to-symbol proximities up to and including the symbol block width 707 may have a Hamming distance that meets or exceeds a design threshold 708, show here, merely for illustration, has the value 4. In this embodiment, a symbol-to-symbol proximity 709 that exceeds the block width 707 may have a value 710 that falls below the design threshold 708. Because high Hamming distance generally indicates low similarity, and low Hamming distance generally indicates high similarity, table 700 may illustrate a pattern configuration in which symbol pairs with symbol-to-symbol proximity at or below the symbol block width 707 may be less similar than symbol pairs with symbol-to-symbol proximity above the symbol block width.

Some embodiments where symbol pairs with low symbol-to-symbol proximity may be less similar may be highly advantageous to 3D measurement systems such as the one depicted in FIG. 4, FIG. 5A, FIG. 5B, and/or FIG. 6. For example, this may enable the pattern to encode symbols for a 3D measurement such that there may be a lower probability that a decoding error may occur between two adjacent symbols. This may be advantageous if such decoding between more proximal symbols may be more difficult to detect than decoding errors between more distal symbols. Such may be the case when an object in the field may be large and may vary slowly between symbols; large symbol changes caused by decoding errors between more distal symbols may be easily detected, scrutinized, removed, and/or corrected. On the other hand, some embodiments in which decoding errors between less proximal symbols may be more difficult to detect may want an alternate embodiment in which more proximal symbols may exhibit a lower Hamming distance than more distal symbols.

Some embodiments extend well beyond embodiments which use Hamming distance as the measure of symbol similarity. In other embodiments, the measure of symbol similarity may be an inner product between two symbols. Still other embodiments may use the sum of differences between two symbols. Yet other embodiments encoding symbols using wavelength may use spectral separation as a measure of symbol similarity. The extent of some embodiments is intended to apply to any radiation pattern projector that includes symbols that may be engineered with a specific ordering.

Figure 8:
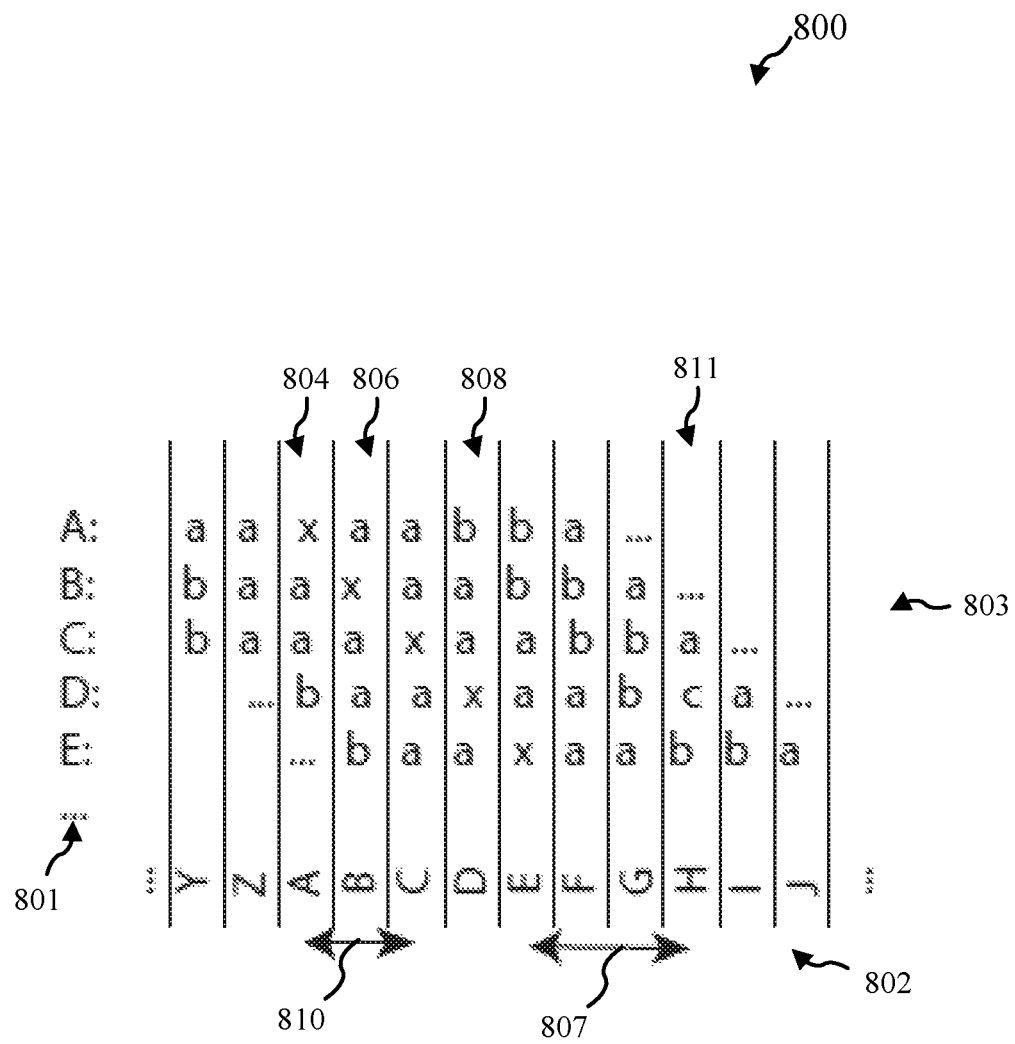
FIG. 8 shows a table in accordance with various embodiments that may illustrate the measures of symbol similarity to show how spatial similarity may be used to order symbols within a pattern.

FIG. 8 provides an embodiment in which symbol similarity is a general concept. FIG. 8 presents a table 800 that may illustrate the measures of symbol similarity 803 to show how spatial similarity may be used to order symbols within the pattern. Devices, systems, and/or methods as shown in FIG. 1A, FIG. 1B, FIG. 2, FIG. 3, FIG. 4, FIG. 5A, FIG. 5B, FIG. 6, FIG. 9, and/or FIG. 10 may implement aspects as related to table 800 in accordance with various embodiments.

The symbol identities may label both the table row 801 and the table column 802 and, in this embodiment, they are represented by a letter. In some embodiments, the row-to-row ordering of the symbols may also represent the relative position of each symbol in the spatial pattern. Some embodiments may be independent of the physical construction of the symbol. In some embodiments, the symbols may be constructed as a spatial configuration of radiation intensity values. In some embodiments, the symbols may be constructed as a sequence of radiation phase values. The symbols may be constructed using one or more physical properties of the radiation, including but not limited to the amplitude, phase, wavelength, coherence, and/or polarization. The symbols may be a single point, or they may be distributed across time, space, or spectrum. To maintain the general concept, table 800 may not show the symbols and may refer to them using the symbol identity values A-Z.

Table 800 generally includes a set of symbol similarity values 804, 806, 808, and 811. At row-column locations where a symbol similarity may be found by comparing one symbol with itself, 804, a symbol similarity value may be labeled with an 'x' to depict a null difference in the similarity.

In some embodiments for which the ordering of table rows matches the order with which they appear in the projected pattern, the symbol-to-symbol proximity may be defined in as the absolute value of the difference between the row number and the column number. For this embodiment, table 800 illustrates an embodiment in which all symbol-to-symbol proximities up to and including the symbol block width 810 have a symbol similarity with values of the type labeled 'a'. In this embodiment, symbol pairs with a symbol-to-symbol proximity 807 which exceeds the block width 810 may have symbol similarity values of the type labeled 'b'. In some embodiments, all values of the type labeled 'a' indicate symbol pairs which are substantially less similar than values of the type labeled 'b'. Table 800 therefore may illustrate a pattern configuration in which symbol pairs with symbol-to-symbol proximity at or below the symbol block width 810 are less similar than symbol pairs with symbol-to-symbol proximity above the symbol block width.

Some variations in the symbol ordering may exist where one or more symbol pairs may produce similarity measures 811 of the type labeled 'c', where the similarity values of type 'c' exceed the similarity values of type 'a', provided said symbol pairs have a proximity larger than the symbol block width 810.

Figure 9:
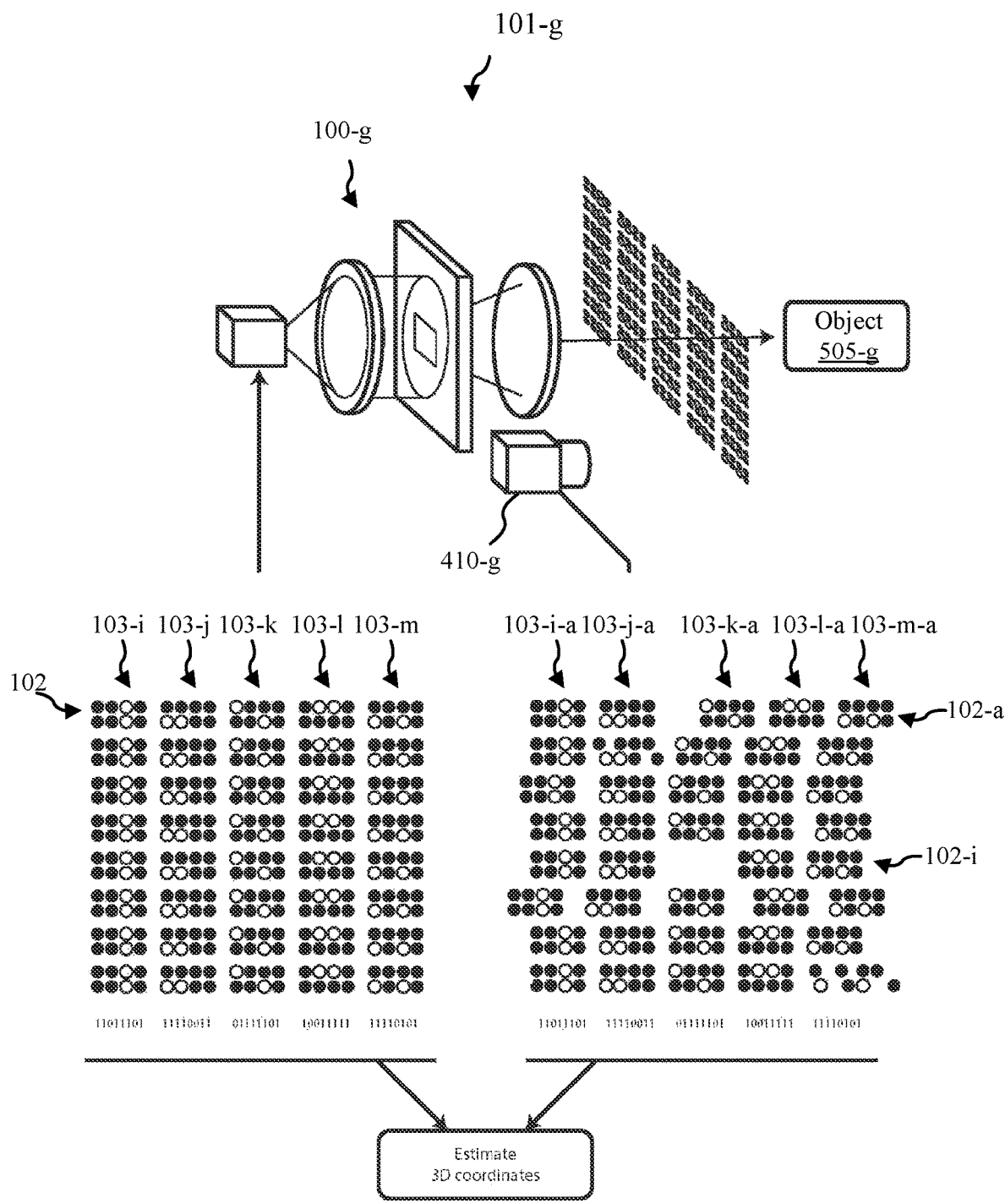
FIG. 9 show a system for 3D measurement in accordance with various embodiments.

Turning now to FIG. 9, a system 101-g is provided in accordance with various embodiments that may provide for 3D measurement through projecting one or more patterns where each pattern from the one or more patterns includes an arrangement of three or more symbols that are arranged such that for each symbol in the arrangement, a degree of similarity between said symbol and a most proximal of the remaining symbols in the arrangement is less than a degree of similarity between said symbol and a most distal of the remaining symbols in the arrangement. System 101-g may be an example of system 101 of FIG. 4, system 101-e of FIG. 5A or FIG. 5B, and/or system 101-f of FIG. 6. For example, system 101-g may show a pattern projector 100-g and an imager 410-g. Pattern projector 100-g may be an example of the pattern projector 100-c of FIG. 3, though other pattern projector configurations may be utilized. System 101-g may also include a processor (not shown).

In the illustrated embodiment, each symbol 103-i, 103-j, 103-k, 103-l, 103-m from pattern 102 includes eight dots placed in two rows and four columns where the dots are either on (shaded) or off (unshaded). In the arrangement of symbols 103, the dots within each symbol 103 may be considered to be modulated by a binary codeword. In the illustration, each symbol 103 may correspond to the binary codeword, and the binary codeword may be used to label each of the columns. In this example, there is an arrangement of five symbols (103-i, 103-j, 103-k, 103-l, 103-m) aligned in a row to form a pattern 102, the pattern 102 may be shown as being repeated vertically as a set of eight rows. In some embodiments, the multiple rows may be considered one pattern, where each row may be considered a separate arrangement of symbols. In some embodiments, projecting more patterns may be achieved by repeating a pattern horizontally or vertically. In some embodiments, projecting more patterns may be achieved by projecting successive patterns, which include one or more arrangements.

In some embodiments, the most proximal symbol in the arrangement is the symbol which shares the same row but resides in the adjacent column. In contrast, the most distal symbol in the arrangement may be the symbol within the row separated by the most columns. The degree of similarity between two symbols may be quantified by calculating the hamming distance between the binary codewords of the two symbols. For example, the arrangement of five symbols 103-i, 103-j, 103-k, 103-l, 103-m shown in the FIG. 9 may depict symbols where the most proximal symbols—or symbols in adjacent columns—have symbols where the symbols have four different dots. In this configuration, the Hamming distance between the codewords of the symbols may be four. The arrangement of five symbols 103-i, 103-j, 103-k, 103-l, 103-m shown in FIG. 9 may depict symbols where the more distal symbols—or symbols separated by 3 or 4 columns—have just two different dots or a Hamming distance of two. Thus, the pattern 102 may maintain the property that more distal symbols have a smaller degree of similarity. In some embodiments, each symbol includes dots in a hexagonal lattice or with irregular spacings. In other embodiments, the spatial configuration of one symbol may vary from that of the other symbols in the arrangement. In some embodiments, one or more symbols may include non-dot shapes including but not limited to squares, dashes, arrows, hearts, clovers, crescents, or diamonds. In some embodiments, the modulation may be non-binary, including an amplitude modulation, a phase modulation, a polarization modulation, or a spatial modulation.

FIG. 9 may also show the detected or collected pattern(s) 102-a with their arrangement of symbols 103-i-a, 103-j-a, 103-k-a, 103-l-a, 103-m-a. As discussed in more detail below, triangulation of the dots in the projected pattern may be utilized to estimate the 3D coordinates of a surface of object 505-g; for example, a combination of three pieces of information may enable the triangulation of each dot in the projected pattern: (i) the baseline separating the camera 410-g from the projector is known, (ii) the illumination angle of each dot, and (iii) the detection angle of each dot.

As may be noted with respect to the fourth row of the detected or collected patterns (e.g., pattern 102-i), one or more regions of the projected pattern may be missing from one or more images. Such missing regions or symbols may be caused by effects including but not limited to; dust on the image sensor, occlusion of one region of the object by a second object, occlusion of one region of the object by a second region of the object, or a region of low reflectivity on the object.

System 101-g of FIG. 9 (or other systems such as system 101 of FIG. 4, system 101-e of FIG. 5A and/or FIG. 5B, and/or system 101-f of FIG. 6) may be utilized to implement a method of 3D measurement. For example, some embodiments of the method include illumination that may be produced as a pattern of dots. The dots may be grouped into symbols and the dots within each symbol may be modulated such that each symbol is unique. In some embodiments, the modulation of each symbol is a binary codeword. In some embodiments, the binary codeword of each symbol is separated by a Hamming distance of at least four when compared to the binary codeword of symbols to the left and right of that symbol. This illumination may be directed substantially at an object. In addition, the illumination angles of each dot within the pattern of dots may be measured and stored. In some embodiments, these illumination angles may be stored by a computer to estimate the 3D coordinates. In some embodiments, the illumination angles may be stored for manual computation of 3D coordinates. The methods to produce such an illumination may generally constitute examples of illuminating step(s) in accordance with various embodiments.

In some embodiments of the method, a camera (such as imager 410 of FIG. 4, detector 410-e of FIG. 5A and/or FIG. 5B, detector 410-f of FIG. 6, and/or camera 410-g of FIG. 9) may be directed substantially at the illuminated object (such as object 505 of FIG. 5A, object 505-e of FIG. 5B, object 505-f of FIG. 6, and/or object 505-g of FIG. 9). In some embodiments, a camera lens may be focused such that an image of the object is substantially formed onto the image sensor of the camera. In some embodiments, the image sensor may capture and digitize the image such that the camera may communicate said digital representation of the image to a computer and/or processor to estimate the 3D coordinates. In some embodiments, the image sensor may capture and digitize the image, and the image sensor may communicate the digital representation of the image to a processor within the camera to estimate the 3D coordinates. The methods taken to capture an image of the illuminated object may constitute an example of detecting or collecting step(s) in accordance with various embodiments.

In some embodiments of the method, a processor may estimate the 3D coordinates of the object surface. The combination of three pieces of information may enable the triangulation of each dot in the projected pattern: (i) the baseline separating the camera from the projector is known, (ii) the illumination angle of each dot, and (iii) the detection angle of each dot. The baseline and illumination may be stored following a calibration step. The detection angle for each dot may be calculated for each detected image. The processor may estimate one 3D coordinate by identifying which projected dot corresponds to each detected dot. Once this correspondence is established, the processor may measure the detection angle of the dot. In some embodiments, the processor may calculate the detection angles of one or more dots in the pattern of dots. In some embodiments, the detection angle for each symbol may be calculated and used to perform triangulation on the symbol. In some embodiments, the detection angle for two or more dots may be calculated and used to perform triangulation for the two or more dots. These aspects may provide examples of a computing step(s) in accordance with various embodiments.

The tools and techniques provided in accordance with various embodiments include novel and inventive features involved with establishing these correspondences. For example, the processor may identify projected symbols within the detected image by grouping regions of pixel values in the image; where the groups of pixel values may be the detected symbol. From here, the method may decode the pixel values of each detected symbol to identify which projected symbol has been detected. In some embodiments, this may be done by matching the detected symbol to one of the projected symbols stored in memory. In some embodiments, a detected symbol codeword may be constructed using binary modulations and the binary codeword for each detected symbol may be calculated by detecting whether pixel values fell above or below a threshold; values above may produce binary values of 1 whereas values below may produce binary values of 0. In some embodiments, the projected symbol may be identified by matching the detected codeword to one in a set of projected codewords. The symbol codewords may be chosen, for example, in a way that closely related codewords may be separated within the projected pattern. As a result, any errors in the decoding of detected symbols may produce much larger errors than if the symbol codewords were related to their neighbors. For objects with contiguous surfaces, this property may allow secondary processing steps to more readily identify decoding errors. Thus, some embodiments may enable systems and methods which deliver higher quality 3D images.

Figure 10:
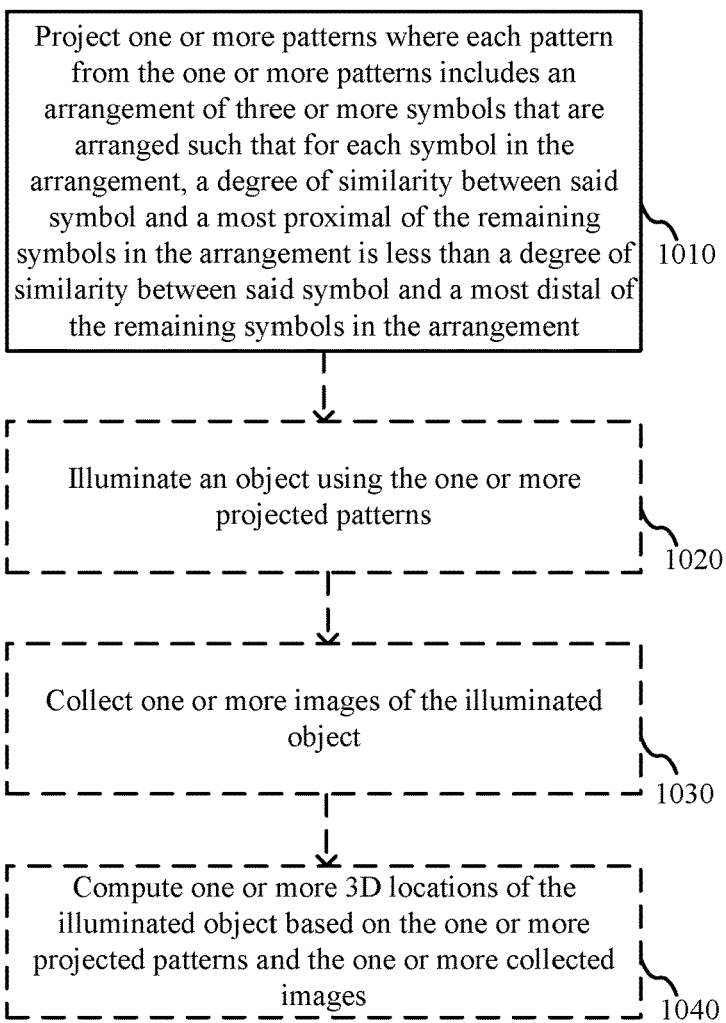
FIG. 10 shows a flow diagram of a method illustrating a process used to project patterns and/or produce 3D measurements in accordance with various embodiments.

For example, FIG. 10 provides a flow diagram of a method 1000 for pattern projection and/or 3D measurement in accordance with various embodiments. The method 1000 may be used in conjunction with devices, tables, and/or systems such as those shown in FIG. 1A, FIG. 1B, FIG. 2, FIG. 3, FIG. 4, FIG. 5A, FIG. 5B, FIG. 6, FIG. 7, FIG. 8, and/or FIG. 9. In FIG. 10, the specific selection of blocks shown and the order in which they are shown is intended merely to be illustrative. It is possible for certain blocks to be performed in alternative orders, for certain blocks to be omitted, and for certain additional blocks to be added according to different embodiments. Some but not all of these variants are noted in the description that follows.

At block 1010, one or more patterns may be projected. Each pattern from the one or more patterns may include an arrangement of three or more symbols that are arranged such that for each symbol in the arrangement, a degree of similarity between said symbol and a most proximal of the remaining symbols in the arrangement is less than a degree of similarity between said symbol and a most distal of the remaining symbols in the arrangement.

Some embodiments of method 1000 may further include additional steps. For example, at block 1020, an object may be illuminated using the one or more projected patterns. At block 1030, one or more images of the illuminated object may be collected. At block 1040, one or more 3D locations of the illuminated object may be computed based on the one or more projected patterns and the one or more collected images.

In some embodiments of the method 1000, the three of more symbols include three or more spatial codewords. In some embodiments, symbol pairs from the three or more symbols that are more proximal in the respective pattern from the one or more patterns are less similar than symbol pairs from the three or more symbols that are less distal in the respective pattern of the one or more patterns. In some embodiments, a most proximal symbol pair from the three or more symbols has a larger Hamming distance than a most distal symbol pair from the three or more symbols.

In some embodiments of the method 1000, the arrangement of three or more symbols is repeated. In some embodiments, a width of the arrangement of three or more symbols is wide enough such that no two regions of the object are illuminated by a same symbol pair from the three or more symbols. In some embodiments, the illuminating is configured to illuminate the object limited to a specific range of distances.

Some embodiments of the method 1000 include dynamically configuring at least the projecting, the illuminating, the collecting, or the computing for one or more working ranges.

In some embodiments of the method 1000, an assessment of the most proximal of the remaining symbols from the arrangement and the most distal of the remaining symbols from the arrangement occurs along a single direction. In some embodiments, all symbol pairs from the three or more symbols with a proximity less than a block width have a Hamming distance that exceeds the Hamming distance of symbol pairs from the three or more symbols with a proximity more than the block width.

Some embodiments of the method 1000 include dynamically configuring at least the projecting, the illuminating, the collecting, or the computing for one or more working ranges such that for each of the one or more working ranges, computing each respective 3D location on the object from the one or more 3D locations utilizes information about a region of the pattern no wider than the block width.

While detailed descriptions of one or more embodiments have been given above, various alternatives, modifications, and equivalents will be apparent to those skilled in the art without varying from the spirit of the different embodiments. Moreover, except where clearly inappropriate or otherwise expressly noted, it should be assumed that the features, devices, and/or components of different embodiments may be substituted and/or combined. Thus, the above description should not be taken as limiting the scope of the different embodiments, which may be defined by the appended claims.

What is claimed is:

1. A system for 3D measurement comprising:
a pattern projector that emits one or more patterns, wherein each pattern from the one or more patterns includes an arrangement of three or more symbols that are arranged such that for each symbol in the arrangement, a degree of similarity between said symbol and a most proximal of the remaining symbols in the arrangement is less than a degree of similarity between said symbol and a most distal of the remaining symbols in the arrangement;

an imager; and a processor configured to estimate one or more 3D locations on an object based on at least:
   illuminating the object using the one or more patterns projected from the pattern projector;
   collecting one or more images of the illuminated object using the imager; and
   computing the one or more 3D locations on the object based on the one or more projected patterns and the one or more collected images.

2. The system of claim 1, wherein the three or more symbols include three or more spatial codewords.

3. The system of claim 1, wherein the three or more symbols are arranged such that for each symbol in the arrangement, a degree of similarity between said symbol and a more proximal of the remaining symbols in the arrangement is less than a degree of similarity between said symbol and a more distal of the remaining symbols in the arrangement.

4. The system of claim 1, wherein a most proximal symbol pair from the three or more symbols has a larger Hamming distance than a most distal symbol pair from the three or more symbols.

5. The system of claim 1, wherein the arrangement of three or more symbols is repeated.

6. The system of claim 5, wherein a width of the arrangement of three or more symbols is wide enough such that no two regions of the object are illuminated by a same symbol pair from the three or more symbols and collected on the one or more images.

7. The system of claim 6, wherein the pattern projector illuminates the object limited to a specific range of distances.

8. The system of claim 6, wherein at least the pattern projector, the imager, or the processor is dynamically configured for one or more working ranges.

9. The system of claim 1, wherein an assessment of the most proximal of the remaining symbols from the arrangement and the most distal of the remaining symbols from the arrangement occurs along a single direction.

10. The system of claim 1, wherein all symbol pairs from the three or more symbols with a proximity less than a block width have a Hamming distance that exceeds the Hamming distance of symbol pairs from the three or more symbols with a proximity more than the block width.

11. The system of claim 1, wherein at least the pattern projector, the imager, or the processor is dynamically configured for one or more working ranges such that for each of the one or more working ranges, computing each respective 3D location on the object from the one or more 3D locations utilizes information about a region of the pattern no wider than a block width.

12. A pattern projection device comprising:
   one or more pattern generators that emit one or more patterns, wherein each pattern from the one or more patterns includes an arrangement of three or more symbols that are arranged such that for each symbol in the arrangement, a degree of similarity between said symbol and a most proximal of the remaining symbols in the arrangement is less than a degree of similarity between said symbol and a most distal of the remaining symbols in the arrangement.

13. The device of claim 12, wherein the three or more symbols include three or more spatial codewords.

14. The device of claim 12, wherein the three or more symbols are arranged such that for each symbol in the arrangement, a degree of similarity between said symbol and a more proximal of the remaining symbols in the arrangement is less than a degree of similarity between said symbol and a more distal of the remaining symbols in the arrangement.

15. The device of claim 12, wherein a most proximal symbol pair from the three or more symbols has a larger Hamming distance than a most distal symbol pair from the three or more symbols.

16. The device of claim 12, wherein the arrangement of three or more symbols is repeated.

17. The device of claim 16, wherein a width of the arrangement of three or more symbols is wide enough such that no two regions of the object are illuminated by a same symbol pair from the three or more symbols.

18. The device of claim 17, wherein the one or more pattern generators are configured to illuminate an object limited to a specific range of distances.

19. The device of claim 17, wherein the one or more pattern generators are dynamically configured for one or more working ranges.

20. The device of claim 12, wherein an assessment of the most proximal of the remaining symbols from the arrangement and the most distal of the remaining symbols from the arrangement occurs along a single direction.

21. The device of claim 12, wherein all symbol pairs from the three or more symbols with a proximity less than a block width have a Hamming distance that exceeds the Hamming distance of symbol pairs from the three or more symbols with a proximity more than the block width.

22. The device of claim 12, wherein the one or more pattern generators are dynamically configured for one or more working ranges such that for each of the one or more working ranges, computing a 3D location on an object utilizes information about a region of the pattern no wider than the block width.

23. A method of pattern projection comprising:
   projecting one or more patterns, wherein each pattern from the one or more patterns includes an arrangement of three or more symbols that are arranged such that for each symbol in the arrangement, a degree of similarity between said symbol and a most proximal of the remaining symbols in the arrangement is less than a degree of similarity between said symbol and a most distal of the remaining symbols in the arrangement.

24. The method of claim 23, further comprising:
   illuminating an object using the one or more projected patterns;
   collecting one or more images of the illuminated object; and
   computing one or more 3D locations of the illuminated object based on the one or more projected patterns and the one or more collected images.

25. The method of claim 23, wherein the three or more symbols include three or more spatial codewords.

26. The method of claim 23, wherein symbol pairs from the three or more symbols that are more proximal in the respective pattern from the one or more patterns are less similar than symbol pairs from the three or more symbols that are less distal in the respective pattern of the one or more patterns.

27. The method of claim 23, wherein a most proximal symbol pair from the three or more symbols has a larger Hamming distance than a most distal symbol pair from the three or more symbols.

28. The method of claim 23, wherein the arrangement of three or more symbols is repeated.

29. The method of claim 28, wherein a width of the arrangement of three or more symbols is wide enough such that no two regions of the object are illuminated by a same symbol pair from the three or more symbols.

30. The method of claim 24, wherein the illuminating is configured to illuminate the object limited to a specific range of distances.

31. The method of claim 24, further comprising dynamically configuring at least the projecting, the illuminating, the collecting, or the computing for one or more working ranges.

32. The method of claim 23, wherein an assessment of the most proximal of the remaining symbols from the arrangement and the most distal of the remaining symbols from the arrangement occurs along a single direction.

33. The method of claim 23, wherein all symbol pairs from the three or more symbols with a proximity less than a block width have a Hamming distance that exceeds the Hamming distance of symbol pairs from the three or more symbols with a proximity more than the block width.

34. The method of claim 23, further comprising dynamically configuring at least the projecting, the illuminating, the collecting, or the computing for one or more working ranges such that for each of the one or more working ranges, computing each respective 3D location on the object from the one or more 3D locations utilizes information about a region of the pattern no wider than the block width.

* * * * *